US012592263B2

(12) United States Patent (10) Patent No.: US 12,592,263 B2
Fielder et al. (45) Date of Patent: Mar. 31, 2026

(54) VIDEO VARIATION EFFECTS

(71) Applicant: SunHaus, LLC, Los Angeles, CA (US)

(72) Inventors: Arthur Jafa Fielder, Los Angeles, CA (US); Jeffrey Korn, Los Angeles, CA (US); Greg Cotten, Los Angeles, CA (US); Jose Manuel Solis Bulos, Nuevo Leon (MX)

(73) Assignee: SUNHAUS, LLC, Los Angeles, CA (US)

( * ) Notice: Subject to any disclaimer, the term of this patent is extended or adjusted under 35 U.S.C. 154(b) by 1 day.

(21) Appl. No.: 18/740,423

(22) Filed: Jun. 11, 2024

(65) Prior Publication Data

US 2024/0412763 A1 Dec. 12, 2024

Related U.S. Application Data

(60) Provisional application No. 63/472,556, filed on Jun. 12, 2023.

(51) Int. Cl.
*G11B 27/031* (2006.01)

(52) U.S. Cl.
CPC .................................. *G11B 27/031* (2013.01)

(58) Field of Classification Search
CPC .................................................... G11B 27/031
See application file for complete search history.

(56) References Cited

U.S. PATENT DOCUMENTS

| | | | | |
|---|---|---|---|---|
| 5,635,982 A * | 6/1997 | Zhang | .................... | G06V 20/40 |
| | | | | 348/E5.067 |
| 5,664,227 A * | 9/1997 | Mauldin | ............... | G06F 16/739 |
| | | | | 715/255 |
| 7,047,494 B2 * | 5/2006 | Wu | ...................... | G06F 16/7854 |
| 8,724,854 B2 * | 5/2014 | Jin | .......................... | G06T 7/246 |
| | | | | 348/169 |
| 8,934,762 B2 * | 1/2015 | Schmit | ................. | G11B 27/005 |
| | | | | 386/206 |
| 10,372,991 B1 * | 8/2019 | Niemasik | ............. | G11B 27/031 |
| 10,777,228 B1 * | 9/2020 | Wilson | ................... | G11B 27/02 |
| 2005/0220345 A1 * | 10/2005 | Chiu | ....................... | G06T 11/60 |
| | | | | 382/164 |
| 2010/0281375 A1 * | 11/2010 | Pendergast | .......... | G11B 27/036 |
| | | | | 715/723 |
| 2012/0327139 A1 | 12/2012 | Margulis | | |

(Continued)

OTHER PUBLICATIONS

Jafa, Arthur, "Lectures of AJ", (Feb. 25, 2013), Retrieved from the Internet: URL:https://www.youtube.com/watch?v=TUBm2_v5RUw, [retrieved on Jul. 19, 2024], 1 pg.

(Continued)

*Primary Examiner* — Gelek W Topgyal
(74) *Attorney, Agent, or Firm* — LOZA & LOZA, LLP; Joseph Swan

(57) ABSTRACT

Provided are, among other things, systems, methods and techniques for introducing variation into a video clip, e.g., by (a) accessing an input video clip that includes a sequence of input video frames; and (b) providing a user interface through which a user is able to design an output video clip by specifying attributes for a set of output video frames, with such attributes: (i) being specified in reference to the input video frames, and (ii) including identification of which of the input video frames is to be used for individual ones of the output video frames.

22 Claims, 6 Drawing Sheets

(56) References Cited

U.S. PATENT DOCUMENTS

| | | | |
|---|---|---|---|
| 2014/0037269 A1* | 2/2014 | Kumar | G06V 10/7715 |
| | | | 386/E5.028 |
| 2014/0229831 A1* | 8/2014 | Chordia | G11B 27/031 |
| | | | 715/717 |
| 2015/0113472 A1 | 4/2015 | Webb et al. | |
| 2018/0089528 A1* | 3/2018 | Chan | G06V 20/49 |
| 2019/0079662 A1 | 3/2019 | Wan et al. | |
| 2020/0302969 A1* | 9/2020 | Boyd | G06V 20/49 |
| 2023/0005167 A1 | 1/2023 | Rodriguez et al. | |

OTHER PUBLICATIONS

Johansson, Gunnar, "Visual perception of biological motion and a model for its analysis", Perception & Psychophysics, vol. 14. No. 2., 1973, pp. 201.211.

The Illusion Almanac, "The History of the Optical Printer", (Mar. 8, 2021), Retrieved from the Internet: URL: https://illusion-almanac.com/2021/03/08/the-history-of-the-optical-printer/, [retrieved on Jun. 22, 2024], 14 pgs.

Emerson College Technology & Media, "Optical Printer Cookbook", Retrieved from the Internet: URL:https://support.emerson.edu/hc/en-us/articles/21709227508635-Optical-Printer-Cookbook#terminology-0-1, [retrieved on Jun. 22, 2024], 4 pgs.

Powers, John, "A DIY Come-On: A History of Optical Printing in Avant-Garde Cinema", https://doi.org/10.1353/cj.2018.0052., Cinema Journal 57, No. 4 (2018), pp. 71-95.

Trumball, Douglas, "A New Kind of Magic: Douglas Trumbull on Magi, HFR and Dynamic Frame Rates", Retrieved from the Internet: URL:https://support.emerson.edu/hc/en-us/articles/21709227508635-Optical-Printer-Cookbook#terminology-0-1, [retrieved on Jul. 3, 2024], 8 pgs.

Brownlow, Kevin, "Silent Films; What Was the Right Speed?", 1980, 18 pgs.

Adobe, "Mixed Frame Rates", Retrieved from the Internet: URL:https://helpx.adobe.com/ph_fil/premiere-pro/how-to/mixed-frame-rates.html, [retrieved on Jul. 9, 2024], 5 pgs.

Adobe, "Change Clip Speed and Duration in Adobe Premiere Pro", (updated Mar. 22, 202), Retrieved from the Internet: URL:https://helpx.adobe.com/premiere-pro/using/duration-speed.html, [retrieved on Jul. 9, 2024], 16 pgs.

Apple Support, "Conform frame sizes and rates in Final Cut Pro for Mac", Retrieved from the Internet: URL:https://support.apple.com/guide/final-cut-pro/conform-frame-sizes-and-rates-ver3363b44e/mac#:~:text=When%20a%20clip's%20frame%20rate,the%20clip%20in%20the%20timeline, [retrieved on Jul. 9, 2024], 5 pgs.

Avid, "Understanding Matchback", Section from Media Composer® Advanced Guide (2009), pp. 592-593.

Illusto; "Adjust the speed of your videos online"; https://illusto.com/speed-ramping/; 2025; Printed Jan. 27, 2025; 7 pages.

The DIY Video Editor; "The Friday Roundup—Speed Ramping and Masking Basics"; https://diyvideoeditor.com/the-friday-roundup-speed-ramping-and-masking-basics/; 2025; Printed Jan. 27, 2025; 13 pages.

Adobe; "Create action speed ramps with Premiere Pro."; https://www.adobe.com/creativecloud/video/hub/guides/premiere-pro-speed-ramp.html#:~:text=Speed%20ramping%20is%20when%20you,standard%20speed%2C%20and%20fast%20motion; 2025; Printed Jan. 23, 2025; 3 pages.

"Black Popular Culture—A Project by Michele Wallace", Edited by Gina Dent; Dia Center for the Arts; Discussions in Contemporary Culture; No. 8; Bay Press; 1992; ISBN: 978-1-56584-459-9; pp. 248-255.

International Search Report and Written Opinion for International Application No. PCT/US2024/033456 dated Aug. 21, 2024, 11 pages.

* cited by examiner

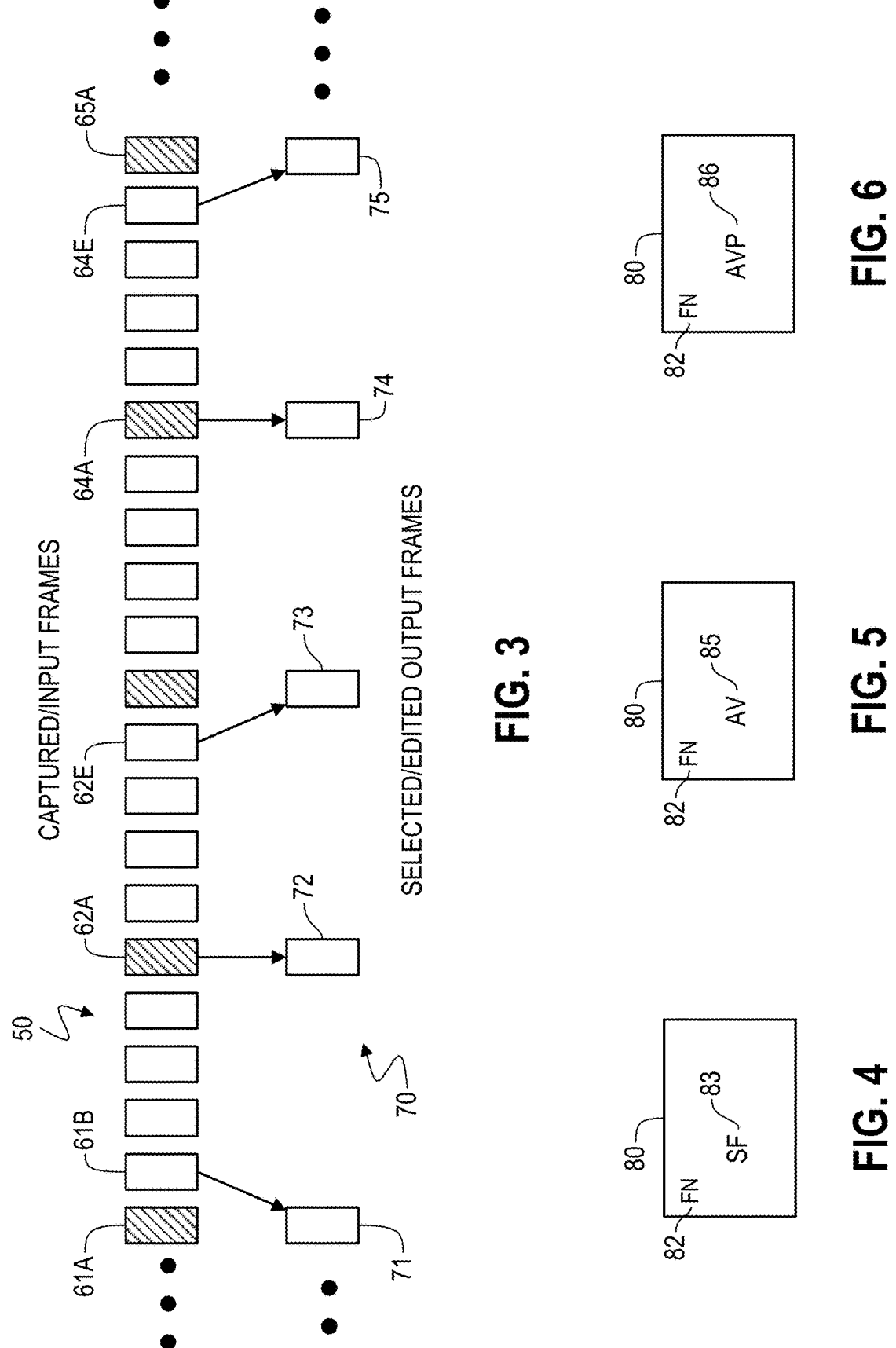

VIDEO VARIATION EFFECTS

FIELD OF THE INVENTION

The present invention pertains, among other things, to systems, apparatuses, methods and techniques for introducing variation into movies and other kinds of video, e.g., for the purpose of providing different kinds of sensory effects, and it also pertains to the video that results from such processing and manipulations.

BACKGROUND

The following discussion concerns certain background information related to the present invention. However, it should be understood that only knowledge clearly, explicitly and specifically described herein as being "conventional" or "prior art" is intended to be characterized as such. Everything else should be understood as knowledge and/or insight originating from the present inventor.

In some respects, moviemaking technology has advanced significantly over the years, e.g.: (1) starting from the original hand-cranked film cameras; (2) progressing through motorized film cameras that were able to provide more consistent and, therefore, more realistic motion capture; and (3) continuing through the initial introduction of, and then through a wide variety of advances in, digital technologies. Digital advances, in particular, have made it much easier and less expensive to do many different kinds of increasingly sophisticated edits after the fact, including digitally altering the actors' appearances, generating entire backgrounds and/ or sets, fully synthesizing lifelike or (if desired) pseudo-lifelike characters, and many other special effects.

However, the present inventor has come to the conclusion that, despite these advancements, and possibly even because of them, filmmaking has largely ignored an entire category of effects that can provide filmmakers additional expressive/ artistic opportunities. This is the primary area upon which the present invention focuses.

SUMMARY OF THE INVENTION

One embodiment of the invention is directed to a system, apparatus, method or set of computer-executable process steps, for introducing variation into a video clip, that is configured to: access an input video clip that is comprised of a sequence of input video frames; and provide a user interface through which a user is able to design an output video clip by specifying attributes for a set of output video frames. Such attributes: i) are specified in reference to the input video frames, and ii) include identification of which of the input video frames is to be used for individual ones of the output video frames.

Certain more-specific implementations of the foregoing embodiment(s) include one or any combination of the following features.

The user is able to individually assign specific ones of the input video frames to specific ones of the output video frames through the user interface.

The user interface allows the user to specify a frame-selection pattern relative to generic corresponding input video frames and a specified segment of the output video frames, and then have the frame-selection pattern continuously repeated across the specified segment of the output video frames.

The user interface permits the frame-selection pattern to be specified by designating a selection of contiguous ones of the output video frames and selecting which of the input video frames are to be used for the contiguous ones of the output video frames.

The specified segment is specified by designating, through the user interface: a starting point and a fixed number of repetitions of the frame-selection pattern.

The specified segment is specified by designating, through the user interface: a starting point and an endpoint.

A step to play the input video clip is provided, and the user interface permits the starting point and the endpoint to be designated in real time as the input video clip is played.

The user interface has different frame-selection patterns mapped to different user-interface elements, and at a point in time when one of the user-interface elements is designated, the frame-selection pattern then currently in effect ceases to be applied and the one of the frame-selection patterns that is mapped to the one of the user-interface elements instead is applied from such point in time forward.

The user interface permits the different user-interface elements to be designated whenever desired in real time while the input video clip is played, resulting in corresponding real-time changes to which of the different frame-selection patterns is applied.

In response to the designations of the different user-interface elements, the processing steps make corresponding modifications to the attributes for the set of output video frames, and the user interface permits subsequent additional modifications to the attributes.

The video-playing step depicts in real time how the video will be displayed in response to the designations of the different user-interface elements.

The user interface permits the user to further modify which of the input video frames is to be used for individual ones of the output video frames in the specified segment after the frame-selection pattern has been continuously repeated across the specified segment of the output video frames.

The user interface permits the identification, of which of the input video frames is to be used for individual ones of the output video frames, to be performed arbitrarily.

The attributes for the set of output video frames also include at least one display characteristic for individual ones of the output video frames.

The display characteristic(s) include at least one of: saturation, color temperature or specific-color adjustment.

The display characteristic(s) include brightness.

The display characteristic(s) include at least one of lateral or vertical shift.

The display characteristic(s) include scale/magnification.

The display characteristic(s) include amount of application of a grain pattern.

The display characteristic(s) include amount of blur.

The foregoing summary is intended merely to provide a brief description of certain aspects of the invention. A more complete understanding of the invention can be obtained by referring to the claims and the following detailed description of the preferred embodiments in connection with the accompanying figures.

BRIEF DESCRIPTION OF THE DRAWINGS

In the following disclosure, the invention is described with reference to the accompanying drawings. However, it should be understood that the drawings merely depict certain representative and/or exemplary embodiments and features of the present invention and are not intended to limit the scope of the invention in any manner. The following is a brief description of each of the accompanying drawings.

FIG. 3 conceptually illustrates selection of input video frames to be used for specific output video frames according to a representative embodiment of the present invention.

FIG. 4 illustrates the basic cell for selecting the specific input video frame to be used for a particular output video frame, according to a representative embodiment of the present invention.

FIG. 5 illustrates a more generic representation of the basic cell for setting the attributes of a particular output video frame according to a representative embodiment of the present invention.

FIG. 6 illustrates an even more generic representation of the basic cell for setting the attributes of a particular output video frame, in which a user sets an attribute value parameter, which can specify the attribute value either with or without reference to other information within the input and/or output video frames, according to a representative embodiment of the present invention.

FIG. 7 illustrates a user interface for setting video frame attribute value parameters, with the interface currently set to allow a user to map input video frames to output video frames, according to a representative embodiment of the present invention.

FIG. 8 illustrates aspects of the user interface for, among other things, creating, saving and using attribute patterns, according to a representative embodiment of the present invention.

DESCRIPTION OF THE PREFERRED EMBODIMENT(S)

Figures 1, 2:
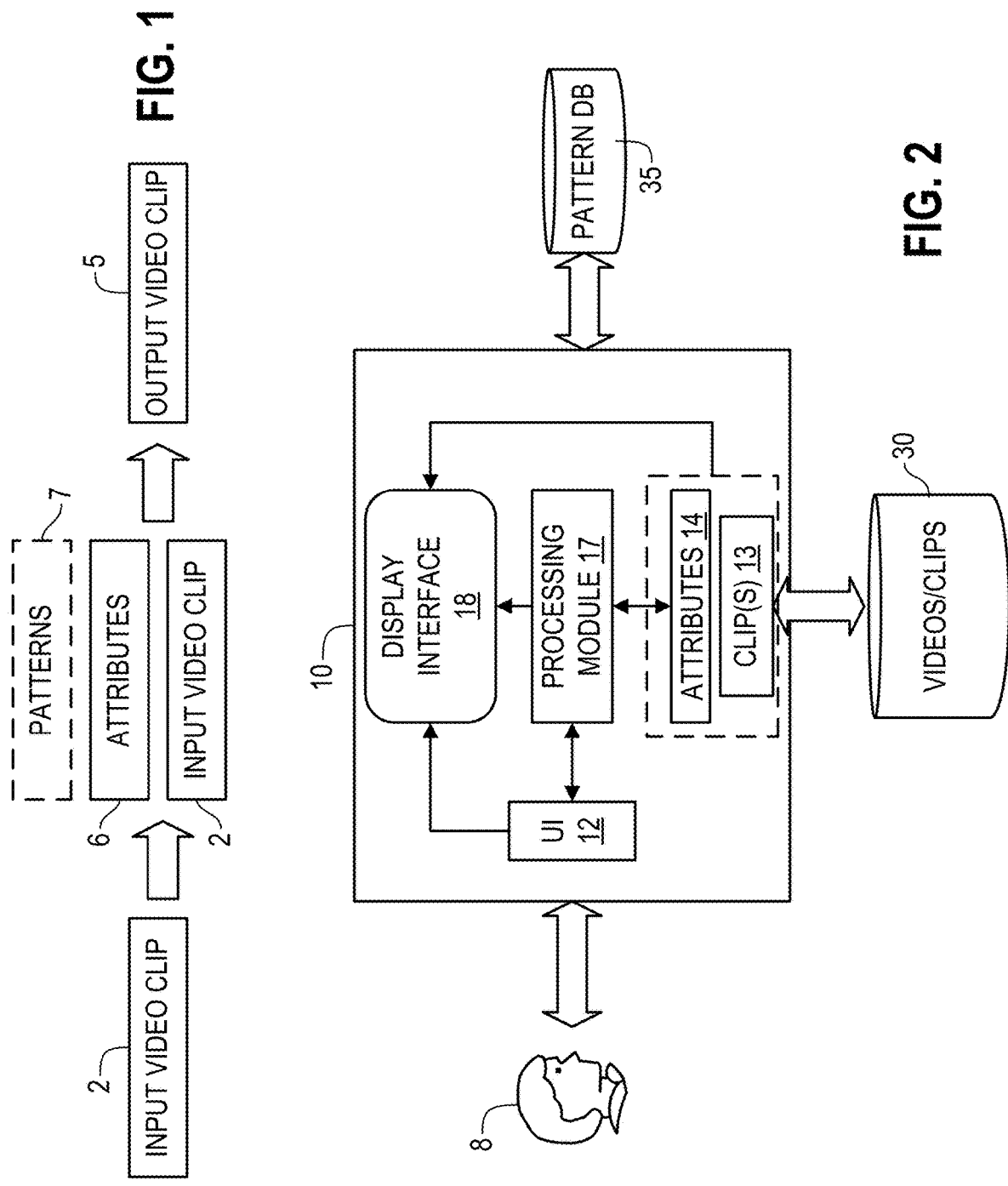
FIG. 1 is a conceptual diagram illustrating the creation of an output video clip based on an input video clip in accordance with the present invention.
FIG. 2 is a block diagram of a system for introducing variation into video clips according to a representative embodiment of the present invention.

For ease of reference, the present disclosure is divided into sections. The general subject matter of each section is indicated by that section's heading. However, such headings are included simply for the purpose of facilitating readability and are not intended to limit the scope of the invention in any manner whatsoever.

Overview

As noted above, digital moviemaking technologies have provided filmmakers with opportunities to do things that were not previously possible or, at a minimum, would have been prohibitively expensive and time-consuming. In certain respects, these advances have made it possible for filmmakers to express themselves in new ways. However, almost all of the prior advances have been built on a foundation that prizes a highly controlled, realistic or pseudo-realistic depiction of what is being portrayed.

In contrast, the present invention has a significant focus on systems, methods and techniques for introducing more intangible characteristics into video that can provide a unique look or feel, either to the entire video or such that different segments of the video have different looks and/or feels. The present inventor has discovered that these characteristics can be provided by allowing filmmakers to introduce certain kinds of variation into video, e.g., in a (fully or partially) controlled manner. Thus, in the preferred embodiments of the present invention, tools are provided for allowing filmmakers to design, specify and/or use different kinds of variation that can, if desired, be applied within different segments of the video. By appropriately selecting and applying variation in accordance with the present invention, a filmmaker is able, e.g., to create appearances, styles and moods that are not possible with conventional techniques, essentially opening up an entire palette of artistic expressions that were not previously available.

At the outset, it is noted that certain types of variation were present in early filmmaking. For instance, when hand-cranking a camera, there would be inevitable variation in the speed at which the camera operator turned the crank, thereby giving the resulting film a kind of uneven look. Similarly, early film projectors often had variation in their playback speeds, thereby contributing to the overall unevenness experienced by the viewer.

Although highly talented camera operators could, consciously or unconsciously, use crank speed to achieve some desired effect, any such efforts necessarily would have been crude, required a significant amount of talent to employ effectively, and, to a large extent (e.g., due to downstream causes such as variable projection speed), often would have yielded unpredictable results. In any event, for the most part, viewers were unhappy with the resulting perceived lack of quality and welcomed the more modern technological advancements that were better able to provide more-realistic-looking video. As indicated above, attempts at realism have largely dominated filmmaking over the last many decades, even in cases where the filmmaker is presenting completely made-up environments and/or characters.

The present invention, on the other hand, has been made with the recognition that variation, when applied appropriately, especially on the micro or subconscious level, can be a highly effective tool for widening the range of expressive qualities that can be incorporated into a film or other video production. Accordingly, the present invention provides, among other things, tools and techniques for designing and/or incorporating different kinds of variation into a video. In the preferred embodiments of the present invention, filmmakers are provided with a great deal of flexibility in this regard, enabling them to create the exact impressions, feelings or moods they want to convey.

In some respects, the present invention can be seen as an extension of the tradition, employed in certain African music, to "worry the notes". This expression refers to how African musicians often introduce fluctuations in the notes they play or sing, providing the resulting music with a unique quality that is not found in Western music and it is impossible to specify using Western musical notation. The present inventor has discovered that this principle can be extended into, and even expanded upon within, the video domain. As discussed in greater detail below, the tools and techniques of the present invention often can provide filmmakers and other video producers many more degrees of freedom with which to express themselves artistically.

Moreover, in the preferred embodiments of the present invention, the user is provided with a great degree of highly granular and flexible control over how variation is to be introduced, allowing the user to produce results that would be impossible to achieve using conventional techniques, such as hand-cranking a camera.

One aspect of the present invention is a technical application for introducing (rather than reducing) Dynamic Visual Phenomena in cinema. The present invention includes, among other things, ways to create various visual phenomena from obsolete film technology using digital film, with the added capacity to produce multiple simultaneous variations which would not be possible with obsolete technology, and also the capacity to manipulate its intensity over time and space, such that it is dynamic. Where Western methods of filmmaking focus on the ability to control and eliminate Dynamic Visual Phenomena such as grain, framerate, and flare, the present invention generally focuses on increasing and fluctuating these phenomena, with the capacity to narrow in on the precise and technical understanding of where to place them. The result may be subtle or intense, with the tendency to sustain a mesmerizing affective quality.

For purposes of the following discussion:

The term "video" refers to any segment of moving images, whether analog or digital, typically two-dimensional images but could also and/or instead be three-dimensional images, typically represented as a sequence of video frames (either directly or, e.g., if compressed, encoded in a manner such that the individual frames can be recovered for playback) that typically are played quickly enough so that the viewer perceives smooth and continuous motion. Video, as used herein, can be stored on any kind of media (e.g., magnetic, optical, semiconductor, film, etc.) and/or can be transmitted (e.g., electronically or via a fiber-optic cable) and typically, although not always, also includes sound (e.g., synchronized audio).

Video can be divided into contiguous clips and/or made up of different clips that are merged together, e.g., played simultaneously, each representing a different layer of the final video. It is noted that, generally speaking, a "clip", as used herein, can be of any length and could even refer to an entire film or other video production.

Specific Embodiments

The preferred mode of operation of the present invention is illustrated conceptually in FIG. 1. As shown, the starting point is a source or input video clip 2, and typically, the ultimate goal will be to produce an output video clip 5 that is based on the input video clip 2. Often, although not necessarily, output video clip 5 will be a stylized version of input video clip 2, with one or more kinds of variation incorporated into it. In certain embodiments of the invention, output video clip 5 can be based on multiple different input video clips 2. However, for simplicity, the present discussion generally will assume that output video clip 5 is based on just a single input video clip 2. In any event, in the preferred embodiments, a set of attributes 6 (e.g., implemented as an attributes file), essentially specifying how to create output video clip 5 based on input video clip 2, is generated and associated with the input video clip 2. Even more preferably, the generation of attributes set 6 utilizes one or more patterns 7 which can, e.g., be any of: (1) created on-the-fly in conjunction with the creation of attributes set 6; (2) created in advance (e.g., while working on a previous project) by the same person or entity who is creating the current attributes set 6; and/or (3) created in advance by any other person or entity who then made some or all of such patterns 7 available to the person or entity who is currently creating the attributes set 6.

In order to create an attributes set 6 and/or one or more patterns 7, in the current embodiment, a user 8 utilizes the system 10 that is illustrated in FIG. 2. Typically, system 10 will be implemented entirely in software, but it instead could be implemented, e.g., using any of, or any combination of, software, firmware and/or hardware, as discussed in greater detail below. More specifically, in the embodiments discussed below, system 10 is implemented in software that runs on a conventional general-purpose computer.

All of the functionality of system 10 preferably is accessed by the user 8 through a user-interface module 12 (which communicates with the user 8 through the computer's input and output devices). Initially, user-interface module 12 permits the user 8 to select (or import) one or more video clips 13 (e.g., from a data-storage unit 30) to be used by the system 10. Then, as discussed in greater detail below, user-interface module 12 interacts with the user 8 so as to allow the user to 8 to add to and/or modify a library 14 of different attribute sets 6 (each typically associated with one or more of the video clips 13) for potentially generating additional video clip(s) 13.

For the purpose of generating and/or modifying an attribute set 6, user interface 12 interacts with the user 8, with the ultimate goal of inputting commands from the user 8, and then processing module 17 implements those commands (e.g., as discussed in greater detail below). In addition, processing module 17 is capable of generating modified video based on an attribute set 6 and the underlying input video 2. Still further, a provided display interface 18 is configured to cause video (either video previously stored as a clip 13 or video generated on-the-fly by processing module 17) to be played, e.g., through the computer's connected display monitor, e.g., as instructed by the user 8 through the user-interface module 12. Thus, e.g., the user 8 can experiment with different effects, view the results on a display monitor (driven by the display interface 18, and then make any desired adjustments. When satisfied with the results, the user 8 can provide an instruction through the user-interface module 12 to export the corresponding video clip, in which case processing module 17 generates a new (output) video clip 5 (e.g., in any standard video format), based on the original source/input video clip 2 and in accordance with the defined attributes 6, and then makes the new video clip 5 available along with the other video clips 13 and/or stores it into the video-clip datastore 30, where it can be accessed later if desired, e.g., for direct playback by an appropriate standard video player (software and/or device).

In addition, or instead, the specified attributes 6 can be stored in library 14 (e.g., as a comma-separated-value, or CSV, file, or using any other standard or proprietary file format) for additional editing later. Links or other associations preferably are provided: in the input video clip 2 (e.g., as metadata), in the attributes file 6, and/or elsewhere in the system 10, to ensure that the video clip 2 and attributes file 6 are tied together. It is noted that multiple different sets of attributes 6 preferably can be associated with a single (e.g., original) input video clip 2, e.g., essentially corresponding to different versions of the particular video clip 2. In that case, in certain embodiments, opening input video clip 2 through system 10 shows all the associated attributes files 6, allowing the user 8 to select and then to edit any of them, or to create an entirely new one. Finally, as discussed in greater detail below, in the course of generating and/or modifying the attribute set 6, processing module 17 often will apply one or more patterns 7. Those patterns 7 might be found to provide desirable video effects that the filmmaker wants to reuse, whether in the current project and/or in later projects. Accordingly, processing module 17 preferably also has the ability to export such patterns, sometimes referred to as repeat-delete-modify (RDM) patterns (also in a CSV or other file format), to an external pattern database 35.

One aspect of the preferred embodiments of the present invention is the provision of tools for performing frame selection. The preferred approach for implementing this feature is to allow the user 8 to designate, through the user-interface module 12, individual frames from the input video clip 2 to be used as the frames in the desired output video clip 5. This concept is illustrated conceptually in FIG. 3, which shows a partial sequence of input video frames 50 and a corresponding sequence of output video frames 70. Typically (and in the currently described embodiment), the input video clip 2 (of which input frames 50 are a part) will have been captured at a higher frame rate than the desired eventual playback frame rate of the output video clip 5 (of which output frames 70 will form a part). However, in alternate embodiments the input and output video clips have the same framerates, or there exists any other relationship between the two framerates.

In the current specific embodiment, the input video frames 50 were captured at a rate of 120 frames per second (fps), and the output playback frame rate is intended to be 24 fps. As a result, a straightforward framerate-conversion routine would simply select every fifth frame of the input video frames 50 to be used as the output video frames 70 (i.e., 120÷24=5), e.g., so that input video frames 61A-65A would be used as output video frames 71-75, respectively.

However, system 10 preferably provides the user 8 with the flexibility to designate any one of the input video frames 50 (e.g., any frame within the input video clip 2) to be used as any one of the output video frames 70 (e.g., any frame within the output video clip 5).

In this particular example: input frame 61B has been designated for use as output frame 71, input frame 62A has been designated for use as output frame 72, input frame 62E has been designated for use as output frame 73, input frame 64A has been designated for use as output frame 74, and input frame 64E has been designated for use as output frame 75.

The present inventor has discovered that the unevenness resulting from selecting frames in a manner other than as a straightforward, regular subsampling (e.g., every fifth frame) can provide the resulting video clip with a specific look or feel that is tied to the particular type of unevenness. In addition, this look/feel is experienced by the viewer even if the viewer is not able to consciously understand or describe what that feeling is or how it was produced. More specifically, differently designed patterns can produce correspondingly different feelings in viewers, and this phenomenon occurs (albeit in different ways), not just with frame selection, but also when similar (e.g., micro-level) variation is introduced in relation to any of a variety of different types of video attributes. Accordingly, one of the main aspects of the present invention is to provide a user 8 with tools for designing, incorporating and/or utilizing such unevenness, or variation, across different video attributes.

For the purpose of making the frame selections discussed above, in the current embodiment, user-interface module 12 presents to the user 8, for each of the output video frames 70, a basic cell 80, e.g., as depicted in FIG. 4. As shown, in the current embodiment, the current frame number (or, in alternate embodiments, any other frame identifier) 82 of the subject output video frame 70 is depicted in the upper left corner of the cell 80, and the selected frame 83 (i.e., the number of, or other identifier for, a particular frame from among the set of input video frames 50) that is intended to be used as this particular output frame 70 is depicted in the center of cell 80. For ease of reference, frame identifiers (e.g., 82 and/or 83) often are just referred to herein as a frame numbers, although it should be understood that any and all references herein to frame numbers can be replaced with references to the more generic term "frame identifiers". As discussed in greater detail below, user-interface module 12 preferably permits the selected frame value 83 to be changed or edited by the user 8 in any of a variety of different ways. Also, it should be noted that the set of output video frames 70 is not static; instead, the user-interface module 12 preferably permits the user 8 to add, delete, copy and/or move output video frames 70 at any desired point(s) in the sequence of such output video frames 70.

Because each output video frame 70 has a corresponding cell 80 and, in the current embodiment, there are no restrictions on the selected frame numbers 83, the user 8 can arbitrarily map input video frames 50 to output video frames 70. Thus, various desired effects can be incorporated into the output video clip 5, e.g.: (1) unevenness or variation in the temporal separation of the frames (as opposed to the input video frames 50 which typically will have been captured in a highly controlled, constant framerate, so that adjacent frames are always separated by the same time interval); (2) noticeable slowing or speeding up the video, as compared to the original/input video clip 2, through sustained use of a temporal separation other than that of the original capture; (3) repetition of the input video frames 50 or segments of the input video frames 50; and/or (4) any other technique or combination of techniques chosen by the user 8.

Up to this point, the discussion has focused exclusively on selecting specific input video frames 50 to be used for specific output video frames 70. As noted above, this flexible frame-mapping technique can allow a video producer to create many different effects. However, the present invention is not limited to just frame-mapping. Instead, e.g., it encompasses tools and techniques for introducing a variety of different kinds of variation into an output video clip 5, in order to achieve a corresponding variety of different visual effects, resulting in a corresponding variety of different looks and/or feels in the resulting output video clip 5.

As shown in FIG. 5, in the current embodiment, the same basic cell 80 is used to set any of a variety of different attribute values (AVs) 85 for the current output video frame 70 (with the current output video frame 70 again being identified by frame number 83 in the upper left corner of cell 80). In the current embodiment, the type of attribute to be manipulated is selected by the user 8 through a user interface element presented by user-interface module 12. For example, in the current embodiment, the presented user interface includes a drop-down menu (discussed below) of the different options, and the user 8 selects the one that he or she wants to manipulate at that moment. In response, user-interface module 12: (1) displays the current value of the selected attribute in the attribute-value field 85 and (2) notifies processing module 17 regarding the attribute-type selection.

As already discussed, one of the options preferably is frame selection (sometimes referred to herein as template temporal position or TTP), and if the user 8 selects that option, then user-interface module 12 causes the attribute-value field 85 to become a frame-selection field 83, as shown in FIG. 4. Other options for different kinds of attribute values that can be selected for modification by the user 8 can include, e.g., any or all of the following picture attributes (i.e., changes in the attributes of individual frames or images):

Brightness: preferably referring to the overall brightness level of the frame.

Saturation: preferably referring to the overall color saturation within the frame, e.g., the level of distinct (non-white) color within the frame relative to the background white level.

Transform X: preferably referring to the amount of lateral or horizontal shift (e.g., with a positive value meaning the specified amount of rightward shift and a negative value meaning the specified amount of leftward shift), typically specified in fixed pixel increments relative to the position of the input video frame 50 that is to be used.

Transform Y: preferably referring to the amount of longitudinal or vertical shift (e.g., with a positive value meaning the specified amount of upward shift and a negative value meaning the specified amount of downward shift), typically specified in fixed pixel increments relative to the position of the input video frame 50 that is to be used.

Scale: preferably referring to the amount of magnification or zoom (e.g., positive or negative) to be applied relative to the input video frame 50 that is to be used.

Grain: preferably referring to the amount, degree or intensity of noise that is to be overlaid onto the frame; in fact, rather than a single grain attribute, options for multiple different kinds of grain can be presented (e.g., with a different entry for each in the drop-down selection menu), such as Modern and/or Film (or vintage) grain, and when multiple different kinds of grain are in fact available, the intensity of each preferably can be adjusted independently.

Blur: preferably referring to the amount of blur (e.g., spread of a pixel's color intensity value(s) to adjacent pixels) to be applied relative to the input video frame; as with Grain, different kinds of blur (e.g., different spread patterns) can be made available (e.g., with a different entry for each in the drop-down selection menu), and in that case, the degree of each preferably can be adjusted independently.

Blue Adjustment: preferably referring to the desired level of the intensity value of the blue color component in the output video frame.

Temperature: preferably referring to the overall color temperature of the output video frame.

In addition, or instead, any other attributes may be included for modification (or variation). For example, instead of or in addition to being able to adjust the blue level, the level of any other specific color (e.g., red or green) may be made available for adjustment. Whatever attributes are in fact made available for modification, the user 8 preferably has the ability to introduce frame-by-frame variation with respect to such attributes, and the same considerations discussed herein generally will also across all such attributes.

Generally speaking, FIG. 5 depicts the configuration of a cell 80 when a particular (independently specified) value for a selected attribute is to be set, such as when the user 8 identifies (1) a specific frame of the input video frames 50 to be used for the current output video frame 70 or (2) a specific overall (e.g., average) brightness value for the current output video frame 70. However, in some cases (potentially depending upon the specific embodiment), the value that is set by the user 8 is intended to be interpreted in relation to one or more existing attributes of the input video frame(s) 50 and/or the output video frame(s) 70. In these cases, as shown in FIG. 6, rather than displaying, and allowing editing of, a specific attribute value 85, the cell 80 displays, and allows editing of, an attribute value parameter (AVP) 86. As used herein, the term "attribute value parameter" is defined broadly so as to encompass either an independent/specific attribute value 85 or any frame-dependent parameter. Examples of a frame-dependent AVP 86 include a(n):

Local Differential: Here, the attribute value parameter 86 is stated as a difference between the frame's default value(s) (e.g., the values as originally captured) and the desired value(s). For example, brightness may be stated as an adjustment value, with: 0 meaning that no changes are made to the frame's original brightness, increasing positive values meaning corresponding increases (e.g., linear or exponential) in the frame's pixel brightness levels, and increasingly negative values meaning corresponding decreases (e.g., linear or exponential) in the frame's pixel brightness levels. As another example, rather than identifying specific frame numbers 83 of the desired input frame 50 to be used as the current output frame 70, a relative frame number 86, indicating the frame-number difference between the desired input frame 50 and the default reference frame (e.g., resulting from a straightforward framerate-conversion routine, e.g., subsampling at regular or constant intervals, such as every fifth frame) is specified, e.g., so that in the specific example shown in FIG. 3, the attribute value parameters 86 for the cells 80 corresponding to output video frames 71-75 would have values of +1, 0, −1, 0, −1, respectively.

Inter-Frame Differential: Here, the attribute value parameter 86 is stated as a difference relative to one or more other frames (input video frame(s) 50 and/or output video frame(s) 70). For example, with respect to frame selection, the attribute value parameter 86 might specify the number of input video frames 50 to advance relative to the input video frame 50 that is to be used for the immediately preceding output video frame 70, e.g., so that in the specific example shown in FIG. 3, the attribute value parameters 86 for the cells 80 corresponding to output video frames 72-75 (the value for output video frame 71 being unspecified because the input video frame 50 to be used for the output video frame 70 immediately preceding output video frame 71 is not shown) would have values of 4, 4, 6, 4, respectively. Alternatively, this value can be the difference between the expected increment (e.g., 5 frames) and the desired increment, so in this case, the attribute value parameters 86 for the cells 80 corresponding to output video frames 72-75 would be −1, −1, +1, −1, respectively; as can be readily appreciated, with this approach, negative values correspond to a slowing down of the playback speed and positive values correspond to a speeding up of the playback speed.

Composite: Here, the value is based on any desired combination of Local Differential and Inter-Frame Differential values.

It is also noted that, e.g., even if the actual desired (e.g., independent) attribute value 85 is specified originally by the user 8, in certain embodiments, subsequent processing (e.g., by processing module 17) will generate and save a modified attribute set 6 or an attribute pattern 7 that includes at least one attribute type specified using frame-dependent values (e.g., either of the foregoing differential values) that have been calculated (or otherwise determined) based on those entered values 85. For example, in each of the cells 80, a user 8 might originally specify the frame number 83 for a specific one of the input video frames 50. Then, later, after a pattern 7 has been defined across multiple cells 80 (e.g., using any of the techniques discussed herein, resulting in selections across one or more attributes for each of multiple contiguous output video frames 70), the user 8 might instruct the user-interface module 12 to save/export the pattern 7 (e.g., into database 35) for later use on other video clips. In that case, the specified attribute values 85 preferably are converted into frame-dependent AVPs 86 (e.g., Local Differential and/or Inter-Frame Differential values) which are then used in the exported pattern 7.

As should be readily apparent, calculation of differential values from existing independent values 85 in the input video frame 50 and/or in the output video frame 70, as applicable, is straightforward. However, such a conversion often can make the pattern more generally applicable to other video clips because differential values are, by nature, more context-aware than are independent attribute values 85. For example, if independent brightness values 85 are inserted into one segment of a different video clip, there might be noticeable abrupt changes in the overall brightness of the video at the beginning and then again at the end of that segment, which might be desirable, from an artistic standpoint, in some cases. Alternatively, to reduce the abruptness of the change at each end of the segment, the video producer might choose to edit the brightness values around each such end to provide smoother transitions. On the other hand, if any such change is not desired at all (e.g., the filmmaker wants that segment to blend seamlessly with the surrounding frames), use of differential brightness values can be used, resulting in the desired introduction of variation, but with that variation made relative to the segment's original brightness levels. Generally speaking, for purposes of exported attribute patterns (at least those that might be used for other video clips), Local Differential values currently are preferred for pixel-value attributes, while Inter-Frame Differential values currently are preferred for frame selection.

Figure 7:
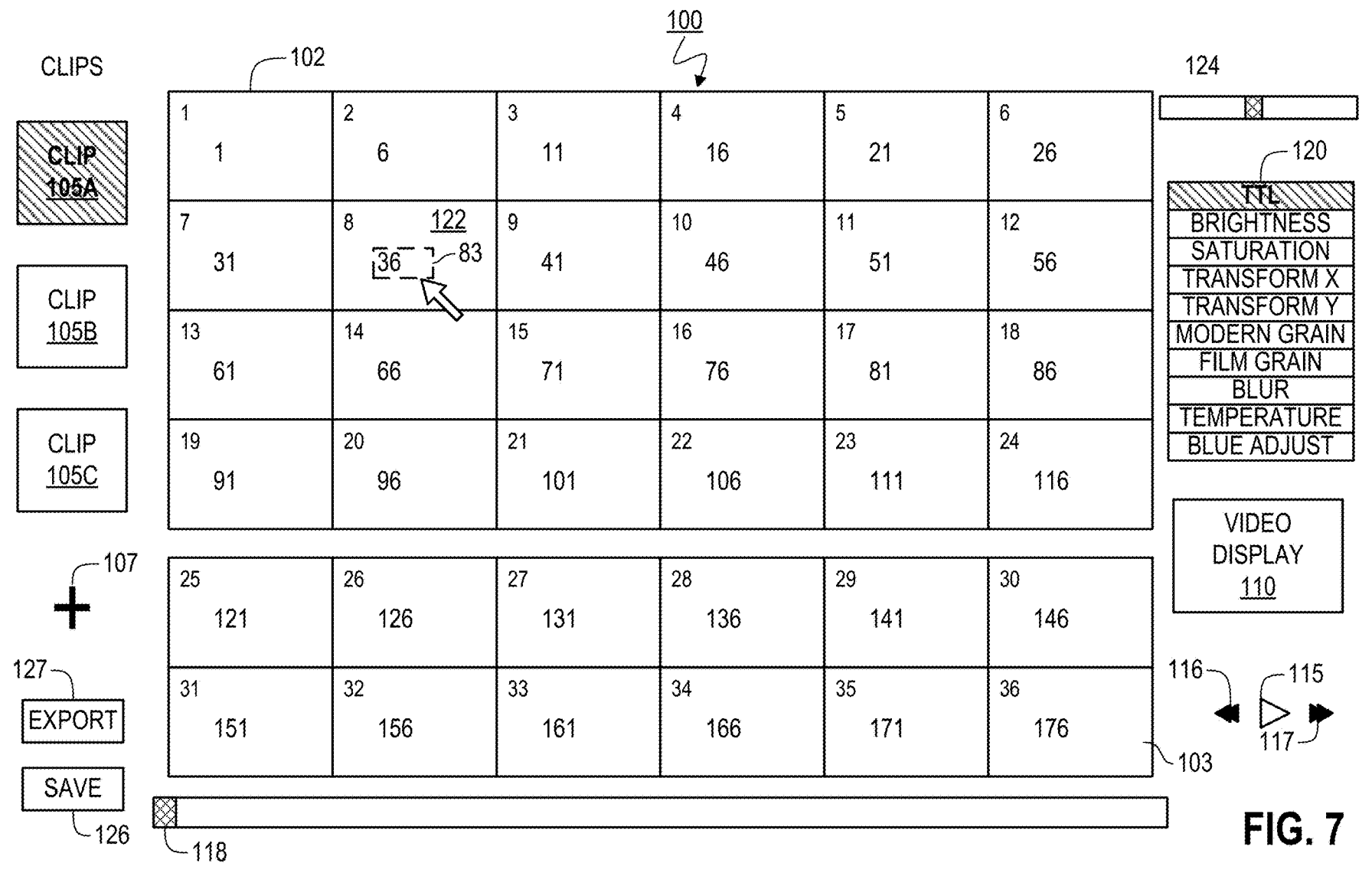

The preceding discussion mainly focuses on a single cell 80. However, in the preferred embodiments, user-interface module 12 simultaneously presents to the user 8 multiple cells 80, corresponding to multiple contiguous frames 70 of the output video. An exemplary user interface 100 of this type is illustrated in FIG. 7. As shown, user interface 100 primarily includes a grid of individual cells 80 which, in this particular embodiment, are divided into two blocks: blocks 102 and 103. Specifically, block 102 includes 24 cells 80, representing one full second of the output video in this example (in which the output video frame rate has been set to 24 fps). However, due to space limitations in the user-interface 100, block 103 includes only 12 cells 80, representing the next one-half second.

Typically, a user 8 begins interacting with user interface 100 by selecting a desired input video clip 2 (with video clip 105A having been selected in the current example, from among clips 105A-C which were previously added to video clip library 13). If a desired video clip is not currently in the library 13, it preferably can be added by clicking on user-interface element 107, navigating to the folder location of the clip, and then selecting and adding the clip. In any event, in the current embodiment, once the desired input video clip 2 has been selected, it becomes visible in a (e.g., conventional) video playback/display window 110, which is shown just symbolically in FIG. 7 in order to focus on other aspects of the user interface 100. Of course, in practice, video playback/display window 110 generally will be relatively much larger and may be placed anywhere that is convenient for the user 8.

At the same time, the cells 80 in boxes 102 and 103 correspond to a time period (in this example, 1½ seconds in duration) encompassing the video frame that is currently displayed on window 110. Preferably, when an input video clip 2 initially is selected, its first frame is displayed in window 110, so cells 80 corresponding to the initial frames (36 such frames in this example) of the input video clip 2 are displayed, as shown in FIG. 7 (i.e., output video frame numbers 82 that range from 1-36 in this example). Again, the displayed cells 80 are tied to what is shown in the video display window 110, so that, e.g., as the video 2 is played or the user 8 otherwise navigates through or around the video 2, the displayed cells 80 change so as to reflect the time period corresponding to the then-current position in the video 2.

Through the user interface 100, the user 8 can, e.g.: (1) play the video 2 by clicking on the play button 115; (2) find a segment of the video where the user 8 would like to create an effect, e.g., by introducing variation; and then (3) move to the beginning of that segment, e.g., using any combination of the rewind button 116, fast-forward button 117, play button 115 (which once activated becomes a pause button, allowing the user 8 to stop at a particular point in the video clip), and/or any other navigation controls provided in the user interface 100 (e.g., playback speed control in order to play the video more slowly and find the precise point at which the effect is desired to begin). In addition to the foregoing playback controls, in the current embodiment, user-interface 100 also includes a timeline slider 118 which can be dragged to show any desired point in time within the video clip 2 (also resulting corresponding changes in the displayed cells 80).

In any event, once at the beginning of the desired segment, the user 8 can begin introducing variation by editing the attribute value parameters 86 of the cells 80 corresponding to those frames. Typically, the first step is to select the specific attribute type to be edited (e.g., for which variation is to be introduced). For this purpose, in the current embodiment, the user 8 goes to the attributes menu 120 (shown in FIG. 7 as a static menu, but instead may be implemented as a drop-down menu or in any other manner) and selects the desired attribute. Here, TTL (or frame-mapping) has been selected and, in response, the attribute value parameters 86 of the displayed cells 80 reflect the currently selected frame (from the input video frames 50) to be used for the output video frames 70 to which such cells 80 correspond. Selecting a different attribute from menu 120 would cause the attribute value parameters 86 of the displayed cells 80 to reflect the current values for that attribute.

In the present case, the attribute value parameters 86 are set to the values that would result from a straightforward subsampling of the input video frames 50 (every fifth frame in the current example). Depending upon the particular embodiment and/or user settings, this result can be provided by default when the input video 2 is selected (e.g., if the intended framerate for the output video clip 5 has already been designated), or a different default can be used (e.g., each input frame 50 is designated by the cell 80 for a unique output frame 70, irrespective of any potentially different framerates), in which case the described uniform frame skipping can be chosen by the user 8, e.g., by applying a desired pattern 7 (as discussed in greater detail below).

However the AVPs 86 have been assigned their current values, by clicking on the AVP field 86 of a particular cell 80, the user 8 can manually change its value. In the example shown in FIG. 7, the user 8 has clicked on AVP field 86 for cell 122 (which has an original value of "36", meaning that frame 36 the input frames 50 is to be used here). In the current embodiment, the user 8 can then type in a new value, in order to designate a different frame (from among the input video frames 50) to be used as the frame corresponding to cell 122. Alternatively, the user 8 can change the AVP 86 value by, e.g.: (1) dragging the slider 124, as desired, (2) clicking on provided "+" or "−" user-interface elements (not shown) to increment or decrement the value, respectively, and/or (3) using any other conventional user-interface element(s) and/or technique(s), or any combination of such user-interface element(s) and/or technique(s), for allowing a user 8 to change a value.

This process can then be repeated by the user 8 for any desired number of cells 80 (and their corresponding frames). For instance, the user 8 can change the frame selection for a group of cells 80, then select a different attribute from menu 120, edit the values for this new attribute for the same cells 80 (or a different overlapping or nonoverlapping group of cells 80), and then keep repeating the process, making any desired modifications. Also, at any point, the user 8 can preview the results of the changes by clicking the play button 115, in which case, processing module 17 generates (e.g., on-the-fly) a temporary video, using the currently defined attribute set 6 and the input video clip 2, and displayed interface 18 causes search temporary video to be played. After previewing the results of such changes, the user 8 can then make further changes to alter those results in order to achieve or fine-tune the desired effect. In certain embodiments, user interface 100 includes a toggle switch, allowing the user to play either: (1) the original video clip 2 or (2) video clip 2 as modified by the specified attribute values 6, as selected by the user 8.

At any point, clicking the "save" button 126 causes the attributes file 6 to be saved in association with the video clip 2, so that the user 8 can resume modifications later. Clicking the "export" button 127 causes the processing module 17 to generate a new output video clip 5 in accordance with the defined attributes 6 (e.g., with the user-interface module 12 first allowing the user 8 to select the video format and corresponding attributes associated with that format, for the output video clip 5).

Similar editing to that described above preferably can be performed for any of the other attribute types that are available through menu 120. In this regard, once a particular attribute type has been selected from menu 120, the displayed cells 80 preferably are automatically changed by the user-interface module 12 to show the current AVPs 86 for that attribute type. As indicated above, those other attribute types typically will be related to frame-display (or, more generally, frame-presentation) characteristics and, by default, when an input video clip 2 is first opened in system 10, each such AVP 86 preferably is set by default to either: (1) the subject value for the frame that has been designated, from among the input video frames 50, for use as the current frame 70, if such AVP 86 is intended to be an independent/ specific attribute value 85; or (2) 0, otherwise (e.g., if such AVP 86 is intended to be a differential value). In either event, user interface 100 preferably permits the user 8 to modify such AVP-values 86, e.g., using any of the techniques and/or user-interface elements discussed above. However, it should be noted that different attribute types might have different considerations, so different user-interface elements can be used for different attribute types and/or their functionality can be dependent upon the selected attribute type. For example, for one attribute type, slider 124 is one of the controls that can be used to change the AVP value 86 itself, while for another attribute type, slider 124 is used to adjust the granularity of integer values entered into the field for the AVP value 86 (e.g., the scale factor applied to that entered value or, more generally, how significant a ±1 change in the entered value will have upon the actual attribute value or the differential or other dependent attribute value, as applicable).

The foregoing discussion primarily pertains to cell-by-cell (or, correspondingly, in reference to the output video frames 70, frame-by-frame) editing of individual attributes (such as any of the attributes listed above) for the output video clip 5. The ability to edit in this manner can provide the user 8 with a tremendous amount of control over the look and feel of different portions of the output video clip 5. At the same time, however, such frame-by-frame editing can be very labor-intensive and time-consuming. Therefore, system 10 preferably provides a variety of functionality for defining variation patterns 7 that can be reused, either in the current video clip 5 or when producing subsequent video clips (e.g., based on different input video clips 2, such as video clip 105B or 105C). That is, the user 8 preferably can define any number of different looks and feels that can be applied whenever and wherever desired. Similarly, different users preferably are able to come up with new looks and feels and then share them with others for use across a wide range of different projects. In fact, using system 10, commercial enterprises, or even creative individuals, can create and then license libraries of different looks and feels (e.g., each represented by a different attribute set 6), e.g., for use by independent filmmakers, and system 10 can make the application of such looks and feels very easy (as discussed in greater detail below).

Figure 8:
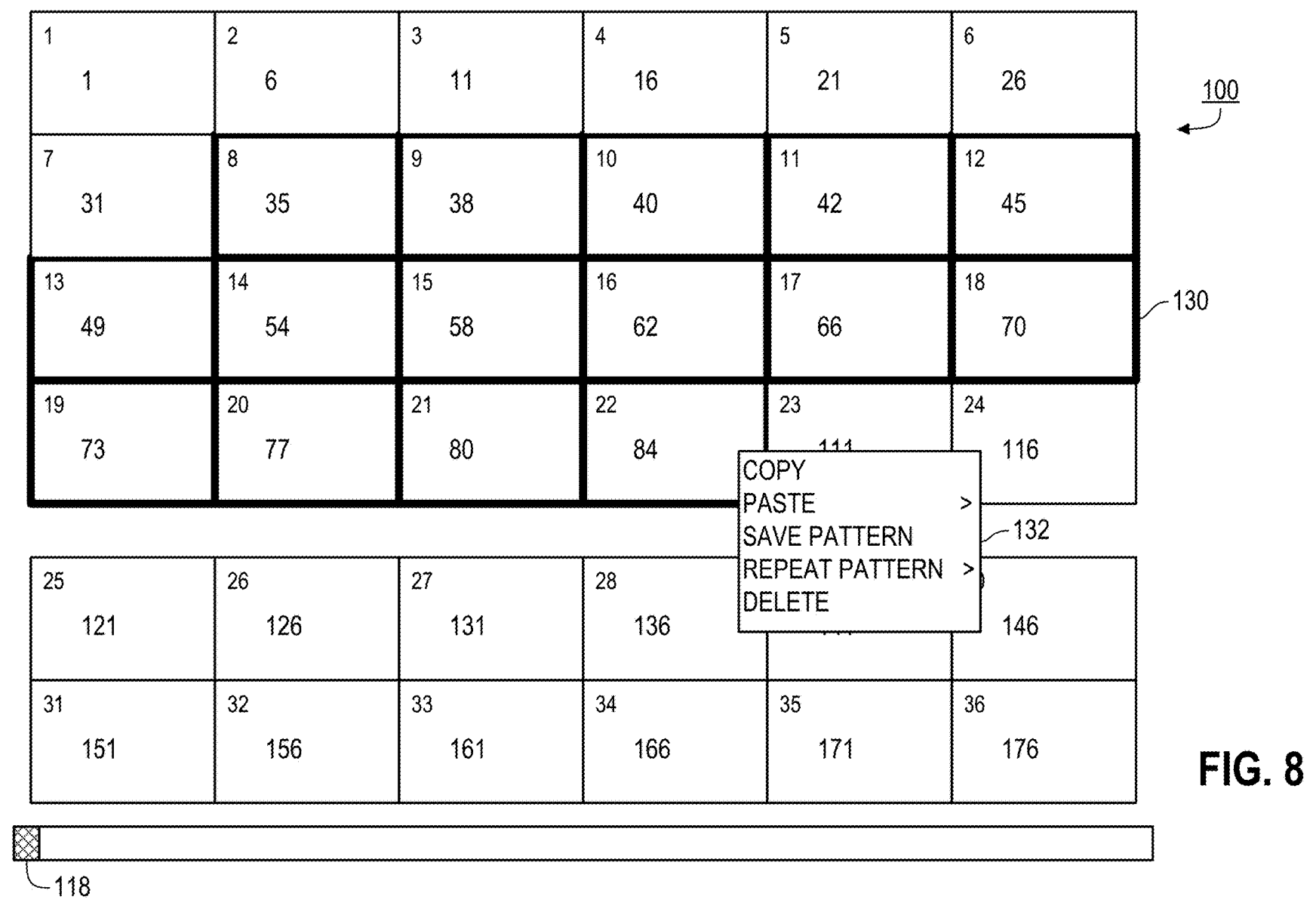

In the preferred embodiments, the initial step in this regard typically is to define a set of variations across one or more attribute types in reference to a particular input video clip 2. When the user 8 is satisfied with how a particular segment of the resulting video looks, a pattern can be defined so as to capture the effect that was applied. FIG. 8 illustrates an example of how this can be accomplished through user interface 100. Basically, after the user 8 has edited the AVPs 86, as discussed above, reviewed the results, and identified a set of contiguous frames that have the desired effect, the cells 80 corresponding to those frames are selected (e.g., clicking at the beginning and at the end while holding down the "shift" key, or using any other conventional technique for selecting multiple contiguous items), e.g., resulting in selection 130, consisting of the cells 80 whose current frame numbers 82 are 8-22. Following such selection, the user 8 interacts with the user interface 100 (e.g., right clicks) in order to cause a menu 132 to be displayed, and the relevant actions that can be taken from menu 132 are as follows:

Copy: Selecting this option preferably results in the attribute values for the selected cells 80 (or at least reference(s) to the selected cells 80, so that their attribute values can be retrieved) being copied into a clipboard or other temporary storage area, for use in further actions, e.g., as described below.

Save Pattern: Selecting this option preferably results in the attribute-value pattern(s) demonstrated by the selected cells 80 being saved, at least locally for access by the system 10, but in certain embodiments and/or based on user settings, also or instead into an external file for sharing, etc. It is noted that the AVPs 86 for such selected cells 80 can be saved directly, or (in certain embodiments and/or based on user settings) some or all of them (e.g., based on the specific attribute types) can first be converted (e.g., by processing module 17) from independent attribute values 85 into dependent values, e.g., as discussed above. Also, rather than saving immediately, in certain embodiments, selecting this option first brings up an additional menu for the user 8 to select from among various "save" options (e.g., selecting only a subset of the attribute types for which values are to be saved and/or designating the attribute types for which values are to be converted from independent to dependent).

Repeat Pattern: Selecting this option preferably results in the attribute-value pattern demonstrated by the selected cells 80 being repeated (e.g., at the current cursor position or after prompting the user 8 to provide a starting position). First, however, an additional menu is displayed, e.g., allowing the user 8 to select how many times the pattern is to be repeated (e.g., with options for 1×, 2×, . . . and with an option for "to end of clip"). Such additional menu also can display any of the options noted above in connection with the "Save Pattern" functionality, or those features instead can be instructed in other user settings or implemented by default.

In the preceding example, the user 8 first identifies a pattern that produces a desired effect and then applies it immediately or saves it for later use. An alternate way of using user interface 100 is to manually define a potential pattern over a short segment of frames (possibly no more than 2-6 frames), use at least one of the foregoing tools to repeat that potential pattern over a longer segment of frames so that it effects are capable of being properly observed and experienced, and then save it only if desired. If not, the potential pattern can be further edited and the foregoing process repeated until the result is in fact what is desired. Especially for purposes of this "testing" approach to designing patterns, any of a variety of "undo" button(s) or other types of user-interface element(s) and/or functionality preferably are provided through user interface 100 to reverse any modifications or other actions, especially pattern repetitions, that have been performed.

After the Copy option has been selected, the user 8 can navigate to a different portion of the video, position the cursor where desired, bring up the menu 132 again, and select the Paste option. In certain embodiments, doing so causes user-interface module 12 to display a sub-menu menu, in which the user 8 has various options, e.g.: (1) to replace the previous AVP 86 values at that point with the previously copied ones, (2) to add the previously copied selection as new frames, or (3) to replace the existing frames with the previously copied ones.

Finally, as shown in FIG. 8, menu 132 also include the option to Delete the selected frames. In addition, user interface 100 can include an option for adding or inserting frames where desired and then specifying the AVP values 86 for such new frames.

Further Discussion of the Preferred Embodiments

The foregoing discussion mainly concerns certain tools and techniques according to the present invention that can be used, among other things, for introducing different kinds of variation into a video. Although the kinds of variation that can be incorporated using such tools and techniques generally is not limited, one distinguishing feature of the present invention is the ability for a video producer to intentionally introduce relatively small, relatively high-frequency variations into temporal frame-spacing and into any of various other visual attributes (e.g., any of the attributes mentioned herein). Often, the magnitude of individual changes will be at or around the human ability to perceive them (which, of course, will vary depending upon the particular attribute type), and/or their temporal separation will be no more than 0.1 second, 0.05 second or even shorter durations (e.g., individual frames in a 24 or 30 fps playback speed). Moreover, in the preferred embodiments, a sequence of such changes, across a single video attribute or multiple video attributes, can be saved as a pattern 7, which can then be repeatedly applied to the current video clip 2 or in any other video clip, in order to extend the resulting effect for as long as the video producer wishes. For this purpose, the user 8 often will want to match the beginning and end of a given pattern 7 to ensure that there is no noticeable discontinuity at the beginning of each new repetition.

In the discussion above, certain specific examples of how to extend a pattern 7 across a desired segment of output video frames 70 were given (e.g., specifying a number of repetitions or specifying to repeat until the end of the clip). However, it should be noted that user-interface module 12 can be configured to accommodate any number of additional ways to apply previously defined patterns 7. For example, a starting point and an endpoint can be specified through the user interface 100.

In addition, more natural and intuitive techniques for applying patterns 7 can be used. For instance, in the preferred embodiments, user-interface module 12 is configured to instruct processing module 17 to apply defined patterns 7 in real time as the video is being played, e.g., as follows:

Drum Pattern Application: In the preferred embodiments that utilize this feature, user-interface module 12 is capable of interfacing with an external Musical Instrument Digital Interface (MIDI) or similar type of device and, more preferably, is connected to a MIDI drum set (although a drum set using any other kind of interface protocol instead may be used), with each drum matched to (i.e., assigned) a different pattern 7. As the input video clip 2 is played in real time, the user 8 can strike any one of the drums, and from that point forward, the corresponding pattern 7 is applied, such that processing module 17 modifies the attribute set 6 accordingly and generates correspondingly modified video to be played by the display interface 18, so that the user 8 can see the results in real time. Also, it is noted that, rather than using a MIDI device, the same technique can be used with the user 8 tapping on keys of a standard computer keyboard (or using any other user-interface elements) that have been assigned different patterns 7.

Musical Keyboard Application: This technique is similar to Drum Pattern Application, and the same considerations apply to it. Here, however, the default is no pattern, i.e., the input video frames 50 are used without modification as the output video frames 70, with just straightforward sampling to account for any difference in the framerates. Also, in this technique, rather than a drum, the preferred MIDI device is a musical keyboard (or a keyboard or any other user-interface elements employing any other interface protocol), with different keys assigned to different patterns 7. A particular pattern 7 is applied only as long as the corresponding key is depressed, and when it is released, no pattern is applied until another (or the same) key is depressed. For this function, a standard computer keyboard, or any device preferably having spring-loaded keys, buttons or other actuators, can be used instead of a MIDI musical keyboard.

Preferably, after application of pattern(s) 7 using either or both of the foregoing techniques, the user 8 can perform additional editing of the attributes file 6 (e.g., for fine-tuning), e.g., using any of the other techniques discussed herein.

As briefly noted above, for the purpose of defining an output video clip 5, multiple different input video clips 2 can be used (e.g., referenced by the attributes file 6), so that an input frame 50 from any one of them can be designated as the frame to be used for any one the output frames 70. This feature can be particularly useful, for example, when the same scene has been shot from different perspectives using different cameras.

As will be readily appreciated, if the input video clip 2 has synchronized audio and the modified output video clip 5 is intended to have the same synchronized audio, resynchro-nization periodically may be required or changing of the audio playback speed may be desirable as frame selection causes the output video clip 5 to drift temporally relative to the input video clip 2. Accordingly, in certain embodiments, processing module 17 is configured to automatically per-form such resynchronizations when such drift exceeds a specified threshold (e.g., during periods when the subject audio track is silent) and/or to cause such changes to the audio playback speed. Also, it should be noted that although introduction of variation has been discussed above in rela-tion to the visual aspects of an input video clip 2, similar techniques can be used to apply variation to any included audio track, although a different set of attributes will be involved with audio (e.g., in this case, time sampling instead of visual frames, loudness or volume, pitch, etc.).

Still further, the discussion above generally refers to the input video 2 consisting of a fixed number of frames 50. However, the present invention is not limited to the initially provided frames. Instead, additional frames can be synthe-sized or interpolated between existing frames, e.g., using artificial intelligence (AI), and in embodiments where such functionality is included, any of such synthesized frames may be specified as a selected frame number 83 (e.g., by including a fractional part in addition to the integer part). One existing tool for performing frame interpolation is Adobe Premiere Pro™. However, any other tool(s) instead may be used for this purpose. Similarly, although introduc-tion of variation has been described above as being a "whole-frame" basis, in alternate embodiments, variation can be specified for individual components within a frame, e.g., using AI to track those components across multiple frames, so that individual visual elements within the output video 5 can be provided with different time-varying visual effects.

Also, the foregoing discussion focuses on deterministic techniques for introducing variation into an input video clip 2. However, in alternate embodiments AVPs 86 also (or instead) can be specified with some degree of randomness (e.g., by specifying a particular random distribution func-tion, including its general form, its mean and/or its variance or standard deviation).

Differential Framerate Considerations and Pattern Conver-sions

The discussion above mainly concerns patterns 7 that have been defined in relation to a particular input framerate (e.g., 120 fps) and/or a particular output framerate (e.g., 24 fps). However, it should be noted that a generic version of any defined pattern 7 typically can be created and then used across a variety of different input and output framerates, e.g., with the aid of an appropriate pattern conversion. In this regard, from the ultimate viewer's standpoint, the desired visual effect(s) (e.g., as described above) mainly are achieved based on the specific magnitude(s) and rate(s) of temporal variation of one or more visual attributes—typi-cally, small, fast-changing variations that are barely, or not at all, noticeable at the conscious level.

When a user 8 defines a pattern with respect to a specified output framerate (e.g., as discussed above), that particular pattern inherently has a corresponding temporal variation with respect to each attribute for which variation has been specified, albeit with variations that have been specified at discrete points in time in accordance with the particular output framerate for which the pattern has been defined. Once again, such temporal variation typically is the main factor in providing the resulting visual effect, and such temporal variation often can be provided across a variety of different input and output framerates, at least approximately (often with some differences as a result of differing sampling intervals), if not precisely.

In addition, in some cases, such as when particular input frames are being selected for use as (i.e., assigned to) specified output frames, the potential output values also are limited to a set of discrete input values (in this case, the discrete images that have been sampled at the input fram-erate, such as 120 fps). Such input sampling also can lead to some variations when converting from one framerate to another. On the other hand, as also discussed above, in certain embodiments, the desired output frame can be selected at any point on the continuous timeline (i.e., between two adjacent input frames) using (e.g., AI-based) frame interpolation.

Figures 9, 10:
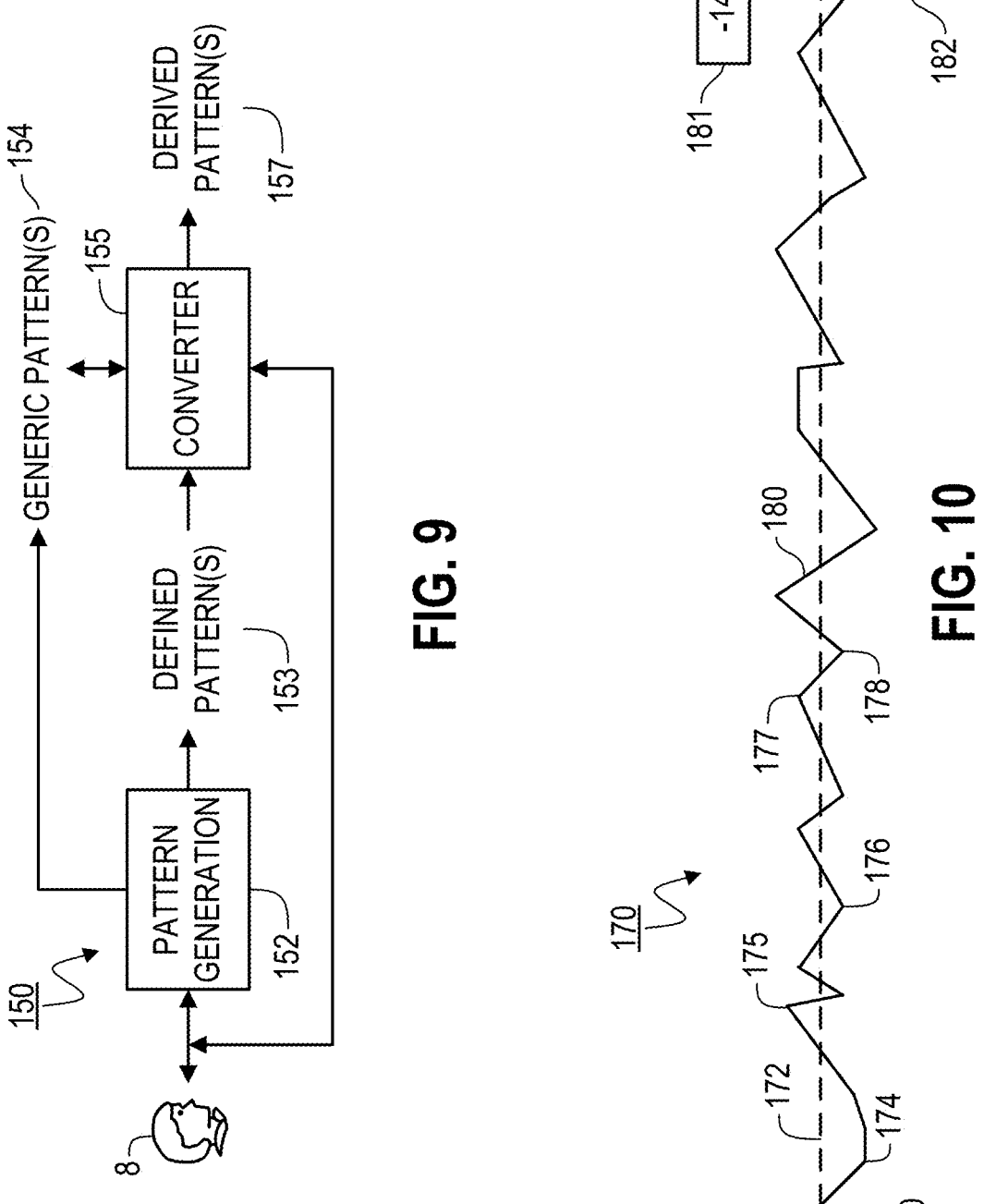
FIG. 9 is a block diagram illustrating a system for pattern generation and conversion according to a representative embodiment of the present invention.
FIG. 10 illustrates a graphical user interface for designing a generic attribute-variation pattern according to a representative embodiment of the present invention, as well as the resulting piecewise linear pattern.

With the foregoing considerations in mind, FIG. 9 illus-trates an overall system 150 for generating and converting patterns 7 according to the present invention. A user 8 interacts with system 150 through a pattern-generation com-ponent 152, which: (1) includes any or all of the function-ality of system 10 (described above) for allowing the user 8 to define pattern(s) 153 in relation to a particular input framerate and a particular desired output framerate (again, as described above); and (2) in the present embodiment, also includes functionality (described below) for allowing the user 8 to specify or create generic patterns 154. As shown, in the current embodiment system 150 also includes a converter 155 for generating additional generic patterns 154 from the defined patterns 153 and/or for generating derived patterns 157 from the originally defined patterns 153 and/or from the generic patterns 154, e.g., with any or all of the foregoing being under the supervision and/or control of the user 8, also as described in more detail below.

In the current embodiment, the functionality of pattern-generation component 152 for allowing the user 8 to design generic patterns 154 permits the user 8 to directly specify the desired temporal variations of one or more different attri-butes. For this purpose, depending upon the particular embodiment, pattern-generation component 152 provides one or more user interfaces (e.g., entirely textual such as the script-based interface described above, entirely graphical, or any combination of the two) for performing such design.

For example, in certain embodiments, pattern-generation component 152 allows the user 8 to define generic pattern(s) 154 using a script-based language, e.g., by specifying a set of data pairs, each pair including (1) an Attribute Value Parameter, preferably specified as a numerical differential or deviation value (e.g., in absolute terms or as a logarithmic value) to be applied to the subject attribute and (2) a timepoint (e.g., from 0 to T, with T being the duration of the pattern in seconds) at which such AVP is to be applied. In this regard, the overall temporal duration of the pattern (T) can be determined as the highest timepoint value specified by the user 8 in the course of creating the particular generic pattern 154, or such overall duration T can be specified in advance by the user 8 so that the user 8 defines the pattern 154 solely within that specified duration.

In the preferred embodiments, the specified variations represent deviations from the input (e.g., captured) values. For instance, one potential attribute is "time" (e.g., a continuous version of the "frame" attribute discussed above), for which the user 8 identifies (when designing the generic pattern 154) the timestamp of the image that is to be displayed at the current playback timestamp, albeit in a differential format (in order to make the generic pattern 154 applicable across a variety of different video segments). As one specific example, at playback timestamp 3.000 seconds within the pattern (which, for example, might have a total duration of 4.500 seconds) the user 8 might specify displaying the image captured at (or around) timestamp 3.074 seconds. For this purpose, in this particular example, the user 8 preferably specifies a value of +0.074 at timestamp 3.000. It is noted that when the pattern ultimately is applied, it typically will repeat continuously for as long as the user 8 designates. Using relative values (e.g., +0.074), the pattern can be applied to any desired video segment (e.g., in which case, at each 3.000 second mark the pattern will indicate that the frame captured at, or close to, +0.074 second ahead of the actual current time should be displayed). In this example, the user 8 specifies a plain differential of the subject attribute value. As noted above, such values can be specified in absolute or relative (e.g., logarithmic or percentage) terms.

Alternatively, and sometimes more preferably, the deviation values are specified as rates (e.g., percentages), so that in the present example 0 indicates that (at that point in time) the video should be played at the same speed originally captured, values above 0 indicate a speeding up of the video (e.g., by the specified percentage) relative to what was originally captured at that particular moment, and values below 0 indicate a slowing down of the video (e.g., by the specified percentage) relative to what was originally captured at that particular moment.

Of course, the same, or at least very similar, considerations also apply to any of the other attributes discussed above. For example, when defined with respect to brightness, a defined pattern can provide a kind of scintillation effect. Moreover, by using relative values in the pattern definition, the brightness values within any given video segment will be varied around their original values, whatever those original values were. With respect to this attribute as well, the values can be specified as (1) absolute or relative plain differential values can be specified (e.g., with positive values meaning that the subject attribute at that timepoint will be increased and negative values meaning that the subject attribute at that timepoint will be decreased by the stated amount relative to what was originally captured); or (2) rates (e.g., percentages, with the subject attribute value increasing at the stated percentage per unit time, or decreasing of the stated percentage per unit time if negative).

The immediately preceding discussion mainly concerns text-based user interfaces for designing generic patterns 154. However, many users 8 will find graphical user interfaces more intuitive or otherwise easier to manipulate. One example of such a graphical user interface 170 is shown in FIG. 10. Initially, the user 8 is presented with just a horizontal default timeline 172, indicating that all variations in the pattern initially are set to 0. Using a mouse, touchscreen or similar pointing device, the user 8 designates deviations from the default line 172 at any desired points in time, with the vertical axis labeled with the amount of variation for the subject attribute, either as absolute deviation values, deviation rates (which typically are preferable for time variation), or logarithmic variations (which often are preferable for brightness, color intensity and other visual attributes that are known to be perceived on a logarithmic scale). In this particular example, the user 8 has specified deviation values, e.g., at each of timepoints 174-178.

In the present embodiment, pattern-generation component 152 generates a complete generic pattern 154 by connecting the timepoints (e.g., points 174-178) designated by the user 8 with straight line segments, such that the resulting generic pattern 180 (i.e., one example of a generic pattern 154) is piecewise linear. As discussed in more detail below, depending upon the specific embodiment, any of a variety of other pattern curves are generated based on those designated points. In any event, a continuously variable generic pattern 154, with values specified at each timepoint within the duration of the pattern 154, results.

As shown, user interface 170 also includes an indicator 181 of the total amount of deviation across the entire duration of the pattern (e.g., updated on a continuous basis as the pattern is edited). This indicator 181 is useful because, in most cases, the user 8 will want the final pattern to provide a net 0 overall deviation. Otherwise, the subject attribute value will drift further and further from its nominal (or original) value with each repetition of the pattern. Such drifting can be problematic, e.g., when the subject attribute is temporal position (or TTP), which can result in the video becoming out of sync with the audio. On the other hand, in some situations, such a drift might be desirable as an artistic choice, such as where the user 8 actually wants a gradual transition to a different look (such as a darker or less bright appearance) in addition to imposing the desired variation pattern. However, even in these cases, the user 8 typically at least will want to know the precise amount of drift that can be expected over time.

In the particular example shown in FIG. 10, the values selected by the user 8 and the other values shown in user interface 170 correspond to rates or percentage differences, so that positive values correspond to an increase in the attribute value during the subject time period, while negative values correspond to a decrease in the attribute value during the subject time period. As a result, the value shown on indicator 181 involves an accumulation or a mathematical integration of such values over the entire duration of the pattern 180.

When a non-zero total deviation results and the user 8 has indicated that the pattern is complete, the pattern-generation component 152 preferably alerts the user 8, so that the user 8 can continue editing, if desired, to bring it down to 0 and/or asks the user 8 (at the time of generating the pattern and/or later, at the time of applying it) if other adjustments should be made to accommodate the deviation (e.g., with respect to a TTP pattern, correspondingly speed up or slow down the audio during application of the pattern, as appropriate, to prevent loss of synchronization, or perform a resynchronization at one or more points where it will not be as noticeable, such as during a quiet time in the video). In the example shown in FIG. 10, the deviations are entered as rates and the accumulation across the entire pattern 180 is negative, so the value shown in indicator 181 also is negative. Finally, it should be noted that the same (or similar) indicator 181 and/or any of the accompanying above-described functionality can be provided with the text-based user interface discussed above or any other user interface for designing patterns (whether generic or frame-based), such as any of the user interfaces described or mentioned herein.

As indicated above, and as is the case with any of the techniques contemplated herein, the total temporal duration 182 of the designed generic pattern 154 (sometimes represented as T), can be specified in advance by the user 8 or can be determined once the user 8 has indicated that the pattern 180 is complete.

Figure 11:
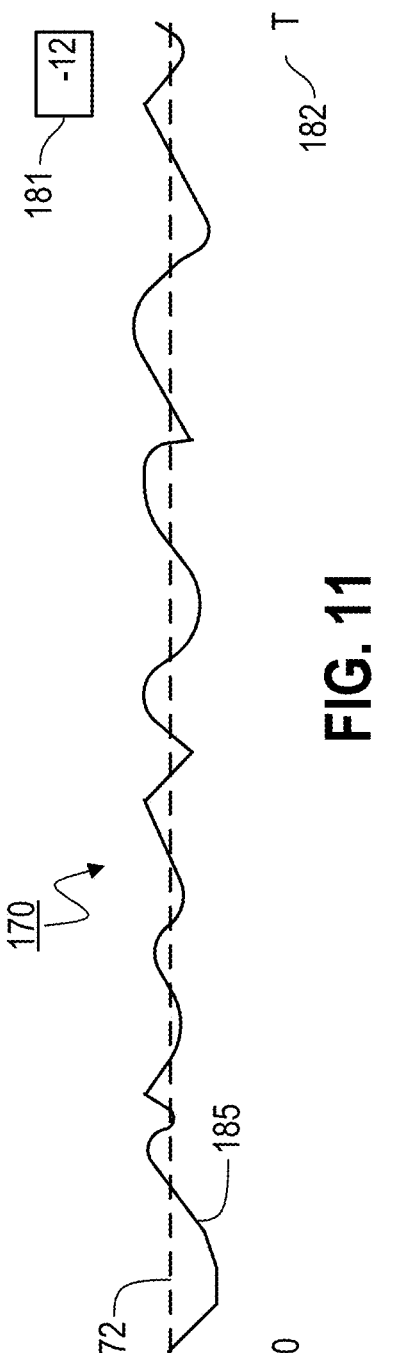
FIG. 11 illustrates an alternate, more smoothly varying generic pattern based on the same selections made by a user that were used to generate the pattern shown in FIG. 10.

FIG. 11 illustrates an alternate generic pattern 185 that has been generated from the same set of selections made by the user 8 that were used to generate generic pattern 180. Here, however, rather than connecting those points by straight lines, pattern-generation component 152 has fit a smoothly varying curve to them, e.g., using polynomial interpolation or regression, or using any other smoothly varying parametric function for interpolation or regression. It is noted that generic pattern 185 is just one other example of a generic pattern that may be generated by pattern-generation component 152 from a discrete set of points specified by the user 8, with the user 8 preferably having the option to choose (through the user interface) which function and methodology to apply. It is further noted that the choice of function sometimes will impact the amount of total deviation across the entire duration of the pattern (shown on indicator 181).

Figure 12:
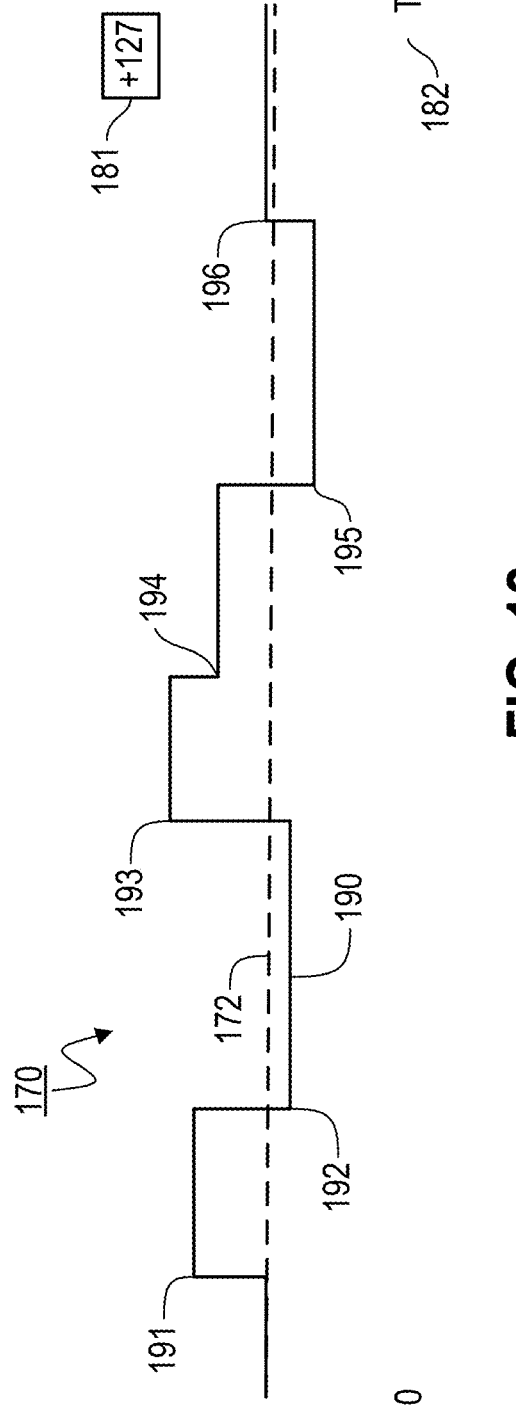
FIG. 12 illustrates another generic pattern based on selections made by a user, in which the value selected by the user for one timepoint is held constant until a different value is selected at a subsequent timepoint.

Another generic pattern 190 that preferably can be generated by pattern-generation component 152 from a set of selections made by the user 8 (in this case, data points 191-196) is shown in FIG. 12. Here, each value selected by the user 8 is maintained until a different value is selected for the very next point selected on the timeline 172.

Returning now to FIG. 9, converter 155 is used, among other things, to convert previously defined frame-based patterns 153 and/or previously designed generic patterns 154 into derived patterns 157 that can be used with specified input and/or output framerates. As discussed previously, patterns 153 typically have been defined with respect to a specific input framerate (e.g., 120 fps) and a specific output framerate (e.g., 24 fps). If the user 8 subsequently wants to use that pattern 153 for a different video segment having a different framerate (e.g., 30 fps) and/or that was generated from an input (originally captured) video at a different framerate (e.g., 90 fps), a conversion of that original pattern 153 into an appropriate derived pattern 157 typically is desirable. For that purpose, it generally is preferable to first convert the originally defined (frame-based) pattern 153 into a generic (time-based) pattern 154, and then the new pattern 157 is generated from such generic pattern 154. By first generating a time-based generic pattern 154, any other variety of different new (or derived) patterns 157 can be relatively easily generated by resampling such time-based generic pattern 154.

The first step (i.e., conversion to a generic pattern 154) preferably is performed in any one of the ways discussed above for initially defining a generic pattern 154. The main difference is that, rather than the user 8 manually selecting the data points that are used to generate the resulting generic pattern 154 (as discussed above), the frame-based pattern values of the pattern 153 are used as those data points, so that the corresponding timepoints begin with 0 and are uniformly separated from each other by the adjacent-frame temporal separation of the original pattern 153, e.g., $\frac{1}{24}$ second, or approximately 41.7 milliseconds (ms). Other than that distinction, all of the other considerations discussed above also apply here.

Conversion from a generic pattern 154 to a frame-based pattern 157 having a specifically designated input (originally captured) framerate and a specifically designated output framerate initially can then be accomplished in a relatively straightforward manner, by simply sampling the generic pattern 154 at the output framerate. For example, if the user 8 wants to use a particular generic pattern 154 on a video segment at 30 fps, the generic pattern 154 is sampled at regular intervals of $\frac{1}{30}$ second, or every approximately 33.3 ms.

In practice, however, such a straightforward conversion typically is just the first step. This is because it might not be possible (or practical) to directly use the values resulting from such sampling. For example, with respect to a TTP pattern, the timepoint corresponding to the sampled value might not match the timepoint of any of the input frames, and instead could fall in the time interval between two input frames. In such a case, it is possible to use frame interpolation (e.g., as discussed elsewhere herein) in order to synthesize the necessary frame. However, doing so can be processing-intensive, so an alternate approach is to choose the input frame that is nearest to the sampled timepoint. A potential drawback of that approach, however, is that the aggregate effect of such "rounding" differences across the pattern might change the emotional impact that the originally designed pattern 153 was intended to have.

One approach to addressing this problem is, rather than rounding each sampled value independently, to select the frames use for in the derived pattern 157 together, e.g., in order to preserve the original relative temporal spacing between the frames (present in the originally designed pattern 153) as much as possible, e.g., by having the converter 155 minimize the overall frame-to-frame temporal deviation. In addition, in certain embodiments, converter 155 generates multiple different temporary versions of the pattern 157 using different selections of the input frames that reflect different attempts to match the sampling of the generic pattern 154 as closely as possible and presents such different versions to the user 8 as applied to a sample video segment, for the user 8 to select the version that best conveys the desired effect.

Also, it is noted that even if a sampled value of the generic pattern 154 is readily available, which ordinarily will be the case for most visual attributes (such as brightness, color component intensities, saturation, etc.), that value still might not be the best value to use for the purpose of replicating the same effect that was achieved with the originally designed pattern 153. This is because the values between the points used for the original pattern 153 have been interpolated in a particular manner that, in fact, might not have been optimal. Therefore, even in these cases, in certain embodiments the user interface of converter 155 presents the user 8 with several options (e.g., each corresponding to a different interpolation approach) for the user 8 to select the one that provides the best effect, e.g., and the converter 155 then preferably modifies the saved generic pattern 154, in accordance with the user 8's selection, for future use. In any event, as should be apparent, after any such conversion, variations might occur in TTP time samples (e.g., variations that are as much as the temporal separation between frames) and/or in picture attribute values (e.g., variations on the order of up to 1-5%), and such variations also should be considered within the scope of the present disclosure.

Although the preceding discussion contemplates situations in which a user 8 initially generates generic patterns 154, ordinarily, the user 8 will want to create patterns 153 that are specific to a given input framerate and/or a given output framerate. As noted above, the concepts for creating a generic pattern 154 are the same (or at least very similar) if a generic pattern 154 is being designed or if it is being generated based on an existing previously defined frame-based pattern 153.

Pattern-Generating Tools

In the discussion above, frame-based patterns 153 are defined manually by the user 8. However, in certain embodiments, tools are provided for allowing automated or semi-automated generation of patterns—frame-based patterns 153 and/or time-based generic patterns 154. For instance, in one representative embodiment, user 8 inputs: (1) a total number of frames; (2) a global range (lower and upper bounds) for random values; and/or (3) an individual range for each frame (or each desired frame). Pattern generator 152 then generates one or more patterns (e.g., as specified by the user 8), e.g., initially by randomly selecting values within the specified ranges, obtaining feedback from the user 8 regarding the desirability of the resulting pattern(s), and then providing more focused pattern generation in the future through the use of machine learning, AI and/or "controlled" randomization (e.g., in the manner discussed in this paragraph). Such automated pattern-generating tools and techniques can significantly increase the efficiency of creating new patterns, as well as assisting the user 8 in developing a more intuitive feel as to the factors that result in desirable patterns.

Exemplary Patterns

Each of the following TTL "core" segments is specified as the number of input video frames to advance forward, relative to the input video frame that was displayed as the previous output video frame. Each such core segment has been found to provide useful and/or interesting effects when used for defining an output video segment and: (1) can be used as a pattern all by itself (i.e., by being repeatedly applied for the entire duration selected by the user 8 for a particular output video clip) or can be used as part of a larger pattern (e.g., applied just a single time or repeated any number of times to form a larger segment, then supplemented with additional preceding cell(s) and/or following cell(s)); (2) can be used in any of the foregoing ways in combination with pattern variations defined with respect to other attribute(s) in order to form a desired attribute set 6; (3) is defined with respect to the input and output framerates identified at the beginning of its paragraph, with the corresponding metronomic (i.e., uniform or constant) frame separation (i.e., corresponding to uniform downsampling, which is just the input framerate divided by the output framerate) also indicated; and (4) when incorporated into a larger pattern (as noted in the first point), preferably is repeated to form a larger segment within that pattern, with such larger segment being equal to, or not less than, $\frac{1}{16}$, $\frac{1}{12}$, $\frac{1}{8}$, $\frac{1}{4}$, $\frac{1}{3}$, $\frac{1}{2}$ or 1 second in duration.

The following core segments are defined with respect to a 120 fps input video (i.e., temporal separation between frames of approximately 8.3 ms) and a 24 fps output video (i.e., temporal separation between frames of approximately 41.7 ms), meaning the metronomic sampling rate frame separation is 5.

Core Segment 1: 4_6
 Core Segment 2: 4_4_4_5_5_6_6_6
 Core Segment 3: 3_7
 Core Segment 4: 2_8
 Core Segment 5: 1_9
 Core Segment 6: 4_6_6_4
 Core Segment 7: 4_6_6_4_4_6
 Core Segment 8: 4_4_6_4_6_6
 Core Segment 9: 4_6_6_4_6_4

Core Segment 10: 4_4_4_6_6_6
 Core Segment 11: 4_4_4_4_4_4_6_6_6_6_6_6
 Core Segment 12: 4_4_4_4_4_4_4_4_4_4_4_4_6_6_6_6_6_6_6_6_6_6_6_6
 Core Segment 13: 3_7_7_3
 Core Segment 14: 3_7_7_3_3_7
 Core Segment 15: 3_3_7_3_7_7
 Core Segment 16: 3_7_7_3_7_3
 Core Segment 17: 3_3_3_7_7_7
 Core Segment 18: 3_3_3_3_3_3_7_7_7_7_7_7
 Core Segment 19: 3_3_3_3_3_3_3_3_3_3_3_3_7_7_7_7_7_7_7_7_7_7_7_7
 Core Segment 20: 2_8_8_2
 Core Segment 21: 2_8_8_2_2_8
 Core Segment 22: 2_2_8_2_8_8
 Core Segment 23: 2_8_8_2_8_2
 Core Segment 24: 2_2_2_8_8_8
 Core Segment 25: 2_2_2_2_2_2_8_8_8_8_8_8
 Core Segment 26: 2_2_2_2_2_2_2_2_2_2_2_2_8_8_8_8_8_8_8_8_8_8_8_8
 Core Segment 27: 1_9_9_1
 Core Segment 28: 1_9_9_1_1_9
 Core Segment 29: 1_1_9_1_9_9
 Core Segment 30: 1_9_9_1_9_1
 Core Segment 31: 1_1_1_9_9_9
 Core Segment 32: 1_1_1_1_1_9_9_9_9_9_9
 Core Segment 33: 1_1_1_1_1_1_1_199999999999_9
 Core Segment 34: 5_5_4_6_3_7
 Core Segment 35: 5_5_4_6
 Core Segment 36: 5_5_4_6_5_5
 Core Segment 37: 5_5_4_6_7_3
 Core Segment 38: 5_5_5_4_5_6
 Core Segment 39: 5_5_5_5_4_6
 Core Segment 40: 5_4_3_5_6_7
 Core Segment 41: 5_4_5_6_3_7
 Core Segment 42: 5_4_5_3_6_7
 Core Segment 43: 3_4_5_5_6_7
 Core Segment 44: 3_4_5_6_5_7
 Core Segment 45: 3_5_4_5_6_7

The following core segments are defined with respect to a 96 fps input video (i.e., temporal separation between frames of approximately 10.4 ms) and a 24 fps output video (i.e., temporal separation between frames of approximately 41.7 ms), meaning the metronomic sampling rate frame separation is 4.

Core Segment 46: 3_5
 Core Segment 47: 5_3
 Core Segment 48: 2_6
 Core Segment 49: 1_7
 Core Segment 50: 4_5_4_3_4_4
 Core Segment 51: 4_5_4_4_4_3
 Core Segment 52: 4_5_3_4_4_4
 Core Segment 53: 4_6_2_4_4_4
 Core Segment 54: 4_6_4_4_4_2
 Core Segment 55: 3_7_4_4_4_2
 Core Segment 56: 3_7_4_4_2_4
 Core Segment 57: 3_7_2_4_4_4
 Core Segment 58: 3_7_4_2_4_4
 Core Segment 59: 2_8_4_4_4_2
 Core Segment 60: 2_8_4_4_2_4
 Core Segment 61: 2_8_2_4_4_4
 Core Segment 62: 2_8_4_2_4_4
 Core Segment 63: 1_9_4_4_4_2
 Core Segment 64: 1_9_4_4_2_4
 Core Segment 65: 1_9_2_4_4_4
 Core Segment 66: 1_9_4_2_4_4
 Core Segment 67: 3_5_5_3

Core Segment 68: 3_5_5_3_3_5

Core Segment 69: 3_3_5_3_5_5

Core Segment 70: 3_5_5_3_5_3

Core Segment 71: 3_3_3_5_5_5

Core Segment 72: 3_3_3_3_3_3_5_5_5_5_5_5

Core Segment 73: 3_3_3_3_3_3_3_3_3_3_3_3_5_5_5_5_5_5_5_5_5_5_5_5

Core Segment 74: 2_6_6_2

Core Segment 75: 2_6_6_2_2_6

Core Segment 76: 2_2_6_2_6_6

Core Segment 77: 2_6_6_2_6_2

Core Segment 78: 2_2_2_6_6_6

Core Segment 79: 2_2_2_2_2_2_6_6_6_6_6_6

Core Segment 80: 2_2_2_2_2_2_2_2_2_2_2_2_6_6_6_6_6_6_6_6_6_6_6_6

Core Segment 81: 4_6_4_2_4_4

Core Segment 82: 4_6_4_4_2_4

Core Segment 83: 1_7_7_1

Core Segment 84: 1_7_7_1_1_7

Core Segment 85: 1_1_7_1_7_7

Core Segment 86: 1_7_7_1_7_1

Core Segment 87: 1_1_ 1_7_7_7

Core Segment 88: 1_7_7_7_7_7_7

Core Segment 89: 1_1_7_7_7_7_7_7_7_7_7_7

The following core segments are defined with respect to a 72 fps input video (i.e., temporal separation between frames of approximately 13.9 ms) and a 24 fps output video (i.e., temporal separation between frames of approximately 41.7 ms), meaning the metronomic sampling rate frame separation is 3.

Core Segment 90: 3_4_5_2_2_2

Core Segment 91: 2_4_3_3_3_3

Core Segment 92: 2_4_2_4_3_3

Core Segment 93: 2_4_2_4_2_4

Core Segment 94: 2_4_3_3_2_4

Core Segment 95: 2_4

Core Segment 96: 2_4_4_2

Core Segment 97: 2_4_4_2_2_4

Core Segment 98: 2_4_4_2_4_2

Core Segment 99: 2_2_4_2_4_4

Core Segment 100: 2_4_4_4_2_2

Core Segment 101: 2_2_2_4_4_4

Core Segment 102: 2_2_2_2_2_2_4_4_4_4_4_4

Core Segment 103: 2_2_2_2_2_2_2_2_2_2_2_2_4_4_4_4_4_4_4_4_4_4_4_4

Core Segment 104: 1_5

Core Segment 105: 1_5_5_1

Core Segment 106: 1_5_5_1_1_5

Core Segment 107: 1_5_5_1_5_1

Core Segment 108: 1_1_5_1_5_5

Core Segment 109: 1_5_5_5_1_1

Core Segment 110: 1_1_1_5_5_5

Core Segment 111: 1_1_1_1_1_1_5_5_5_5_5_5

Core Segment 112: 1_1_1_1_1_1_1_1_1_1_1_1_5_5_5_5_5_5_5_5_5_5_5_5

In each of the core segments defined above: a value equal to the metronomic sampling rate frame separation corresponds to playback at normal speed in that instant, a value greater than the metronomic sampling rate frame separation corresponds to a faster playback speed, and a value lower than the metronomic sampling rate frame separation corresponds to a slower playback speed. Also, each of the core segments defined above is synchronous, meaning that at the end of each repetition, audio and video will be in sync (which is preferable). Accordingly, it generally is preferable to repeat such core segments an integer number of times (no application of a partial core segment), i.e., using an integer number of repetitions to form a larger segment that is either used as a pattern by itself or is incorporated into a larger pattern.

One example of such a larger pattern, based on core segment 1 identified above, is: [optional leading segment]_ [4_6_4_6_4_6_ . . . ]_[optional trailing segment], where the core segment (i.e., 4_6) is repeated an integer number of times over a specified time period, such as ¼ second, and the optional leading and trailing segments, if provided, are specified as desired, but preferably also maintain synchronization. Any application of a core segment as a pattern (or any other synchronous pattern for that matter), e.g., by system 10, preferably is automatically repeated an integer number of times, unless otherwise specified by the user 8, in order to maintain synchronization, e.g., with a default that if the user 8 designates to cease applying a particular pattern in the middle of that pattern, system 10 nevertheless automatically continues to apply the pattern until the instance already in progress is completed. As indicated above, application of an asynchronous pattern sometimes is desirable, or at least tolerable, provided that the user 8 is notified of the amount of drift and/or appropriate steps are taken to resynchronize audio and video.

It also should be understood that any of the foregoing core segments (or larger segments generated by repeating them) can be converted to generic patterns 154 (e.g., defined at each point across a continuous time interval) and/or derived patterns 157 (e.g., having other input and/or output framerates), e.g., in accordance with any of the techniques described herein, e.g., with appropriate variations to accommodate such conversions, such as time variations on the order of up to 0.5-1.0 of the maximum temporal separation between frames, input or output, and/or original (as listed above) and/or picture attribute value variations on the order of up to 1-5%. It should be noted that all such generic patterns 154 and derived patterns 157 that have been converted from any of such core segments or larger segments also should be considered additional core segments or larger segments (as applicable) within the scope of the present disclosure.

Additional Considerations

The foregoing discussion typically contemplates generating an output video (typically at a lower frame rate, such as 24 fps) from an input video (typically at a higher framerate, such as 120 fps), and further contemplates that the input video has been captured, e.g., using a high-speed camera. However, any or all of the input video frames instead may have been computer-synthesized, manually created and/or generated in any other way, and the term "captured", as used herein with respect to video, except where specifically qualified otherwise, is intended to be just synonymous with "input" (the two terms being used interchangeably herein), and both terms are intended to encompass any form of video frame capture or generation.

TTP pattern variations often are described above in relation to the metronomic sampling rate, which is just conventional downsampling. One of the innovations of the present invention is to use non-metronomic or irregular frame downsampling (i.e., selecting input frames to be used as output frames where at least one sampling interval is different than another).

As used herein, the term "coupled", or any other form of the word, is intended to mean either directly connected or connected through one or more other components, elements or processing blocks, e.g., for the purpose of preprocessing. In the drawings and/or the discussions of them, where individual steps, components, modules or processing blocks are shown and/or discussed as being directly connected to each other, such connections should be understood as couplings, which may include additional steps, components, modules, elements and/or processing blocks. Unless otherwise expressly and specifically stated otherwise herein to the contrary, references to a signal herein mean any processed or unprocessed version of the signal. That is, specific processing steps discussed and/or claimed herein are not intended to be exclusive; rather, intermediate processing may be performed between any two processing steps expressly discussed or claimed herein, except to the extent expressly stated otherwise.

As used herein, the term "attached", or any other form of the word, without further modification, is intended to mean directly attached, attached through one or more other intermediate elements or components, or integrally formed together. In the drawings and/or the discussion, where two individual components or elements are shown and/or discussed as being directly attached to each other, such attachments should be understood as being merely exemplary, and in alternate embodiments the attachment instead may include additional components or elements between such two components. Similarly, method steps discussed and/or claimed herein are not intended to be exclusive; rather, intermediate steps may be performed between any two steps expressly discussed or claimed herein.

Whenever a specific value is mentioned herein, such a reference is intended to include that specific value or substantially or approximately that value. In this regard, the foregoing use of the word "substantially" is intended to encompass values that are not substantially different from the stated value, i.e., permitting deviations that would not have substantial impact within the identified context. For example, stating that a continuously variable signal level is set to a particular value should be understood to include values within a range around such specifically stated value that produce substantially the same effect as the specifically stated value. For example, the identification of a single length, width, depth, thickness, etc. should be understood to include values within a range around such specifically stated value that produce substantially the same effect as the specifically stated value. As used herein, except to the extent expressly and specifically stated otherwise, the term "approximately" can mean, e.g.: within ±10% of the stated value or within ±20% of the stated value.

In the preceding discussion, the terms "operators", "operations", "functions" and similar terms refer to method or process steps or to hardware components, depending upon the particular implementation/embodiment.

In the event of any conflict or inconsistency between the disclosure explicitly set forth herein or in the accompanying drawings, on the one hand, and any materials incorporated by reference herein (whether explicitly or by operation of any applicable law, regulation or rule), on the other, the present disclosure shall take precedence. In the event of any conflict or inconsistency between the disclosures of any applications or patents incorporated by reference herein, the disclosure most recently added or changed shall take precedence.

For purposes of the present disclosure, any explicit or implicit reference to any data items being included within the same database record means that such data items are linked together or logically associated with each other. Also, except to the extent clearly and expressly indicated to the contrary, references herein and/or in the accompanying drawings to information being included within a database, or within different databases, are not to be taken as limiting;

rather, such references typically are intended to simplify and/or more clearly illustrate the subject discussion, and in alternate embodiments any or all of the referenced information can be distributed across any number of database structures, as is well-understood in the art.

Unless clearly indicated to the contrary, words such as "optimal", "optimize", "maximize", "minimize", "best", as well as similar words and other words and suffixes denoting comparison, in the above discussion are not used in their absolute sense. Instead, such terms ordinarily are intended to be understood in light of any other potential constraints, such as user-specified constraints and objectives, as well as cost and processing or manufacturing constraints.

In certain instances, the foregoing description refers to clicking or double-clicking on user-interface buttons (typically in reference to desktop computers or laptops), touching icons (typically in reference to devices with touchscreens), dragging user-interface items, or otherwise entering commands or information via a particular user-interface element or mechanism and/or in a particular manner. All of such references are intended to be exemplary only, it being understood that each such reference, as well as each other aspect of the present invention as a whole, encompasses designation or entry of commands or information by a user in any of the ways mentioned herein or in any other known manner, using the same or any other user-interface element or mechanism, with different entry methods and different user-interface elements being most appropriate for different types of devices and/or in different situations. In addition, or instead, any and all references to inputting commands or information should be understood to encompass input by an automated (e.g., computer-executed) process.

In the above discussion, certain methods are explained by breaking them down into steps listed in a particular order. Similarly, certain processing is performed by showing and/or describing modules arranged in a certain order. However, it should be noted that in each such case, except to the extent clearly indicated to the contrary or mandated by practical considerations (such as where the results from one step are necessary to perform another), the indicated order is not critical but, instead, that the described steps and/or modules can be reordered and/or two or more of such steps (or the processing within two or more of such modules) can be performed concurrently.

References herein to a "criterion", "multiple criteria", "condition", "conditions" or similar words which are intended to trigger, limit, filter or otherwise affect processing steps, other actions, the subjects of processing steps or actions, or any other activity or data, are intended to mean "one or more", irrespective of whether the singular or the plural form has been used. For instance, any criterion or condition can include any combination (e.g., Boolean combination) of actions, events and/or occurrences (i.e., a multipart criterion or condition).

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

As used herein, the words "include", "includes", "including", and all other forms of the word should not be understood as limiting, but rather any specific items following such words should be understood as being merely exemplary.

Several different embodiments of the present invention are described above and/or in any documents incorporated by reference herein, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the intent and the scope of the invention. Accordingly, the invention is not limited to the precise embodiments shown in the drawings and described above. Rather, it is intended that all such variations not departing from the intent of the invention are to be considered as within the scope thereof, as limited solely by the claims appended hereto.

System Environment

Generally speaking, except where clearly indicated otherwise, all of the systems, methods, modules, components, functionality and techniques described herein can be practiced with the use of one or more programmable general-purpose computers. Such devices (e.g., including any of the electronic devices mentioned herein) typically will include, for example, at least some of the following components coupled to each other, e.g., via a common bus: (1) one or more central processing units (CPUs); (2) read-only memory (ROM); (3) random access memory (RAM); (4) other integrated or attached storage devices; (5) input/output software and circuitry for interfacing with other devices (e.g., using a hardwired connection, such as a serial port, a parallel port, a USB connection or a Fire Wire connection, or using a wireless protocol, such as radio-frequency identification (RFID), any other near-field communication (NFC) protocol, Bluetooth or a 802.11 protocol); (6) software and circuitry for connecting to one or more networks, e.g., using a hardwired connection such as an Ethernet card or a wireless protocol, such as code division multiple access (CDMA), global system for mobile communications (GSM), Bluetooth, a 802.11 protocol, or any other cellular-based or non-cellular-based system, which networks, in turn, in many embodiments of the invention, connect to the Internet or to any other networks; (7) a display (such as a liquid crystal display, an organic light-emitting display, a polymeric light-emitting display or any other thin-film display); (8) other output devices (such as one or more speakers, a headphone set, a laser or other light projector and/or a printer); (9) one or more input devices (such as a mouse, one or more physical switches or variable controls, a touchpad, tablet, touch-sensitive display or other pointing device, a keyboard, a keypad, a microphone and/or a camera or scanner); (10) a mass data-storage unit (such as a hard disk drive, a solid-state drive, or any other type of internal storage device); (11) a real-time clock; (12) a removable storage read/write device (such as a flash drive, a memory card, any other portable drive that utilizes semiconductor memory, a magnetic disk, a magnetic tape, an opto-magnetic disk, an optical disk, or the like); and/or (13) a modem (e.g., for sending faxes or for connecting to the Internet or to any other computer network). In operation, the process steps to implement the above methods and functionality, to the extent performed by such a general-purpose computer, typically initially are stored in mass data-storage unit (e.g., a hard disk or solid-state drive), are downloaded into RAM, and then are executed by the CPU out of RAM. However, in some cases the process steps initially are stored in RAM or ROM and/or are directly executed out of mass storage.

Suitable general-purpose programmable devices for use in implementing the present invention may be obtained from various vendors. In the various embodiments, different types of devices are used depending upon the size and complexity of the tasks. Such devices can include, e.g., multiprocessor computers, one or more server boxes, workstations, personal (e.g., desktop, laptop or tablet) computers and/or smaller computers, such as personal digital assistants (PDAs), wireless telephones (e.g., smartphones) or any other programmable appliance or device, whether stand-alone, hard-wired into a network or wirelessly connected to a network.

In addition, although general-purpose programmable devices have been described above, in alternate embodiments one or more special-purpose processors or computers instead (or in addition) are used. In general, it should be noted that, except as expressly noted otherwise, any of the functionality described above can be implemented by a general-purpose processor executing software and/or firmware, by dedicated (e.g., logic-based) hardware, or any combination of these approaches, with the particular implementation being selected based on known engineering tradeoffs. More specifically, where any process and/or functionality described above is implemented in a fixed, predetermined and/or logical manner, it can be accomplished by a processor executing programming (e.g., software or firmware), an appropriate arrangement of logic components (hardware), or any combination of the two, as will be readily appreciated by those skilled in the art. In other words, it is well-understood how to convert logical and/or arithmetic operations into instructions for performing such operations within a processor and/or into logic gate configurations for performing such operations; in fact, compilers typically are available for both kinds of conversions.

It should be understood that the present invention also relates to machine-readable tangible (or non-transitory) media on which are stored software or firmware program instructions (i.e., computer-executable process instructions) for performing the methods and functionality and/or for implementing the modules and components of this invention. Such media include, by way of example, magnetic disks, magnetic tape, optically readable media such as CDs and DVDs, or semiconductor memory such as various types of memory cards, USB flash memory devices, solid-state drives, etc. In each case, the medium may take the form of a portable item such as a miniature disk drive or a small disk, diskette, cassette, cartridge, card, stick etc., or it may take the form of a relatively larger or less-mobile item such as a hard disk drive, ROM or RAM provided in a computer or other device. As used herein, unless clearly noted otherwise, references to computer-executable process steps stored on a computer-readable or machine-readable medium are intended to encompass situations in which such process steps are stored on a single medium, as well as situations in which such process steps are stored across multiple media.

The foregoing description primarily emphasizes electronic computers and devices. However, it should be understood that any other computing or other type of device instead may be used, such as a device utilizing any combination of electronic, optical, biological and chemical processing that is capable of performing basic logical and/or arithmetic operations.

In addition, where the present disclosure refers to a processor, computer, server, server device, computer-readable medium or other storage device, client device, or any other kind of apparatus or device, such references should be understood as encompassing the use of plural such processors, computers, servers, server devices, computer-readable media or other storage devices, client devices, or any other such apparatuses or devices, except to the extent clearly indicated otherwise. For instance, a server generally can (and often will) be implemented using a single device or a cluster of server devices (either local or geographically dispersed), e.g., with appropriate load balancing. Similarly, a server device and a client device often will cooperate in executing the process steps of a complete method, e.g., with each such device having its own storage device(s) storing a portion of such process steps and its own processor(s) executing those process steps.

What is claimed is:

1. A non-transitory tangible medium storing computer-readable, computer-executable process steps for introducing variation into a video clip, wherein said process steps include steps to:

(a) access an input video clip that is comprised of a sequence of input video frames; and (b) provide a user interface through which a user is able to design an output video clip by specifying attributes for a set of output video frames, wherein said attributes: (i) are specified in reference to the input video frames, and (ii) include identification of frames to be used for individual ones of the output video frames based on the input video frames, and wherein the user interface allows the user to (i) specify a frame-selection pattern relative to generic corresponding input video frames and a specified segment of the output video frames, and then (ii) have said frame-selection pattern continuously repeated across the specified segment of the output video frames.

2. The non-transitory tangible medium according to claim 1, wherein the user is able to individually assign specific ones of the input video frames to specific ones of the output video frames through the user interface.

3. The non-transitory tangible medium according to claim 1, wherein the user interface permits said frame-selection pattern to be specified by designating a selection of contiguous ones of the output video frames and selecting which of the input video frames are to be used for said contiguous ones of the output video frames.

4. The non-transitory tangible medium according to claim 1, wherein said specified segment is specified by designating, through the user interface: a starting point and a fixed number of repetitions of said frame-selection pattern.

5. The non-transitory tangible medium according to claim 1, wherein said specified segment is specified by designating, through the user interface: a starting point and an endpoint.

6. The non-transitory tangible medium according to claim 5, wherein said process steps further include a step to (c) play the input video clip, and wherein the user interface permits the starting point and the endpoint to be designated in real time as the input video clip is played.

7. The non-transitory tangible medium according to claim 6, wherein the user interface has different frame-selection patterns mapped to different user-interface elements, and wherein at a point in time when one of said user-interface elements is designated, the frame-selection pattern then currently in effect ceases to be applied and the one of the frame-selection patterns that is mapped to said one of said user-interface elements instead is applied from said point in time forward.

8. The non-transitory tangible medium according to claim 7, wherein the user interface permits said different user-interface elements to be designated whenever desired in real time while the input video clip is played, resulting in corresponding real-time changes to which of the different frame-selection patterns is applied.

9. The non-transitory tangible medium according to claim 8, wherein in response to said designations of said different user-interface elements, said processing steps make corresponding modifications to the attributes for the set of output video frames, and wherein the user interface permits subsequent additional modifications to said attributes.

10. The non-transitory tangible medium according to claim 9, wherein said step (c) depicts in real time how the video will be displayed in response to said designations of said different user-interface elements.

11. The non-transitory tangible medium according to claim 1, wherein the user interface permits the user to further modify which of the input video frames is to be used for individual ones of the output video frames in the specified segment after the frame-selection pattern has been continuously repeated across the specified segment of the output video frames.

12. The non-transitory tangible medium according to claim 1, wherein the user interface permits said identification, of which of the input video frames is to be used for individual ones of the output video frames, to be performed arbitrarily.

13. The non-transitory tangible medium according to claim 1, wherein said attributes for the set of output video frames also include at least one display characteristic for individual ones of the output video frames.

14. The non-transitory tangible medium according to claim 13, wherein said at least one display characteristic comprises at least one of: saturation, color temperature or specific-color adjustment.

15. The non-transitory tangible medium according to claim 13, wherein said at least one display characteristic comprises brightness.

16. The non-transitory tangible medium according to claim 13, wherein said at least one display characteristic comprises at least one of lateral or vertical shift.

17. The non-transitory tangible medium according to claim 13, wherein said at least one display characteristic comprises scale/magnification.

18. The non-transitory tangible medium according to claim 13, wherein said at least one display characteristic comprises amount of application of a grain pattern.

19. The non-transitory tangible medium according to claim 13, wherein said at least one display characteristic comprises amount of blur.

20. A video produced using the process steps of claim 1, wherein as a result of said repeated application of the frame-selection pattern, the video exhibits variation in temporal frame separation, also referred to as non-metronomic time, during said repeated application.

21. The video according to claim 20, wherein the input video clip was captured at a constant frame rate.

22. The video according to claim 21, having a frame rate that is lower than said constant frame rate.

* * * * *